(12) United States Patent
Asayama et al.

(10) Patent No.: US 10,873,720 B2
(45) Date of Patent: Dec. 22, 2020

(54) BIRD'S-EYE VIEW VIDEO GENERATION DEVICE, BIRD'S-EYE VIEW VIDEO DISPLAY DEVICE, BIRD'S-EYE VIEW VIDEO GENERATION METHOD, AND NON-TRANSITORY STORAGE MEDIUM

(71) Applicant: JVC KENWOOD Corporation, Yokohama (JP)

(72) Inventors: Manabu Asayama, Yokohama (JP); Noboru Katsumata, Yokohama (JP); Takuji Teruuchi, Yokohama (JP)

(73) Assignee: JVC KENWOOD Corporation, Yokohama (JP)

( * ) Notice: Subject to any disclaimer, the term of this patent is extended or adjusted under 35 U.S.C. 154(b) by 0 days.

(21) Appl. No.: 16/374,760

(22) Filed: Apr. 4, 2019

(65) Prior Publication Data
US 2019/0230309 A1 Jul. 25, 2019

Related U.S. Application Data

(63) Continuation of application No. PCT/JP2018/008416, filed on Mar. 5, 2018.

(30) Foreign Application Priority Data

Apr. 3, 2017 (JP) ................. 2017-073795
May 17, 2017 (JP) ................. 2017-098054
May 17, 2017 (JP) ................. 2017-098143

(51) Int. Cl.
*H04N 7/18* (2006.01)
*H04N 5/445* (2011.01)
(Continued)

(52) U.S. Cl.
CPC ........... *H04N 5/44504* (2013.01); *B60R 1/00* (2013.01); *G06K 9/00791* (2013.01); *G06T 7/50* (2017.01);
(Continued)

(58) Field of Classification Search
CPC ... H04N 5/44504; G06T 7/70; G06K 9/00791
(Continued)

(56) References Cited

U.S. PATENT DOCUMENTS

2010/0019934 A1  1/2010 Takano
2015/0364043 A1  12/2015 Lee
(Continued)

FOREIGN PATENT DOCUMENTS

GB    2416901      2/2006
JP    2006-224778  8/2006
(Continued)

OTHER PUBLICATIONS

International Search Report and Written Opinion for International Patent Application No. PCT/JP2018/008416 dated May 22, 2018, 12 pages.

(Continued)

*Primary Examiner* — Jefferey F Harold
*Assistant Examiner* — Jean W Desir
(74) *Attorney, Agent, or Firm* — Amin, Turocy & Watson, LLP

(57) ABSTRACT

A bird's-eye view video generation device includes a video data acquiring unit configured to acquire video data of surroundings video of a vehicle captured by cameras; a bird's-eye view video generator configured to generate a bird's-eye view video displaying a predetermined display area around the vehicle by performing viewpoint conversion and synthesizing processings on the video data of the surroundings videos with a vehicle icon; a reference object detector configured to detect a reference object around the vehicle; an orientation specifying unit configured to specify a relative orientation of the reference object with respect to the vehicle; a superimposing processor configured to generate a superimposed bird's-eye view video by superimpos- (Continued)

ing information representing the relative orientation on the bird's-eye view video based on the vehicle icon or the information representing the relative orientation; and a display controller configured to cause a display panel to display the superimposed bird's-eye view video.

12 Claims, 40 Drawing Sheets

(51) Int. Cl.
| | |
|---|---|
| *G06T 7/70* | (2017.01) |
| *H04N 5/265* | (2006.01) |
| *H04N 5/262* | (2006.01) |
| *H04N 5/272* | (2006.01) |
| *G06T 7/50* | (2017.01) |
| *G06K 9/00* | (2006.01) |
| *B60R 1/00* | (2006.01) |
| *H04N 5/232* | (2006.01) |
| *G06F 3/0481* | (2013.01) |
| *G06T 1/00* | (2006.01) |

(52) U.S. Cl.
CPC ........... *G06T 7/70* (2017.01); *H04N 5/23238* (2013.01); *H04N 5/265* (2013.01); *H04N 5/2628* (2013.01); *H04N 5/272* (2013.01); *H04N 7/18* (2013.01); *G06F 3/04817* (2013.01); *G06T 1/00* (2013.01); *G06T 2207/10016* (2013.01); *G06T 2207/30236* (2013.01)

(58) Field of Classification Search
USPC .................. 348/147, 148, 140, 143, 118
See application file for complete search history.

(56) References Cited

U.S. PATENT DOCUMENTS

| | | |
|---|---|---|
| 2017/0228605 A1 | 8/2017 | Konishi |
| 2018/0259346 A1* | 9/2018 | Katsumata ........... G01C 21/265 |

FOREIGN PATENT DOCUMENTS

| | | |
|---|---|---|
| JP | 2008-083990 | 4/2008 |
| JP | 2009-096306 | 5/2009 |
| JP | 2009-284386 | 12/2009 |
| JP | 2013-116696 | 6/2013 |
| JP | 2016-088104 | 5/2016 |

OTHER PUBLICATIONS

Extended European Search Report for European Patent Application No. 18781926.3 dated Nov. 15, 2019.

European Office Action for European Patent Application No. 18781926.3 dated Jun. 19, 2020.

* cited by examiner

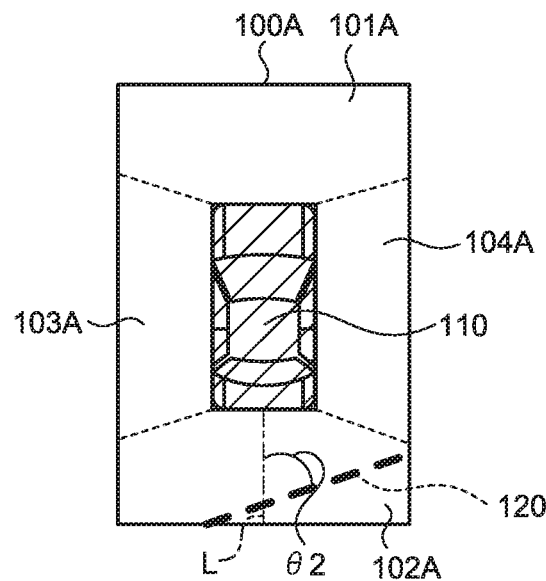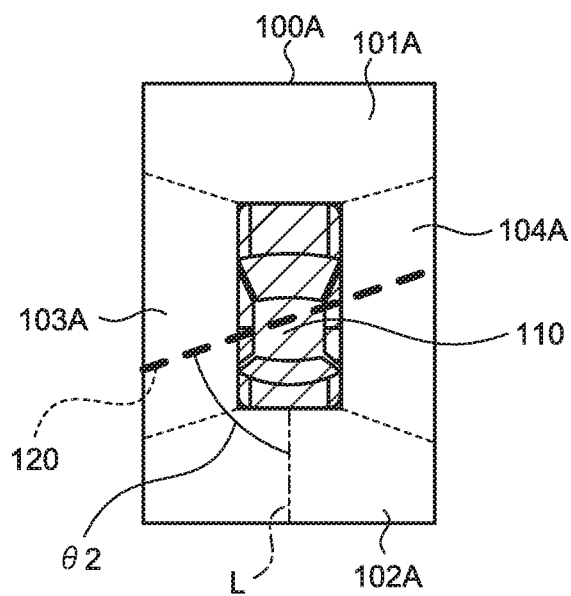

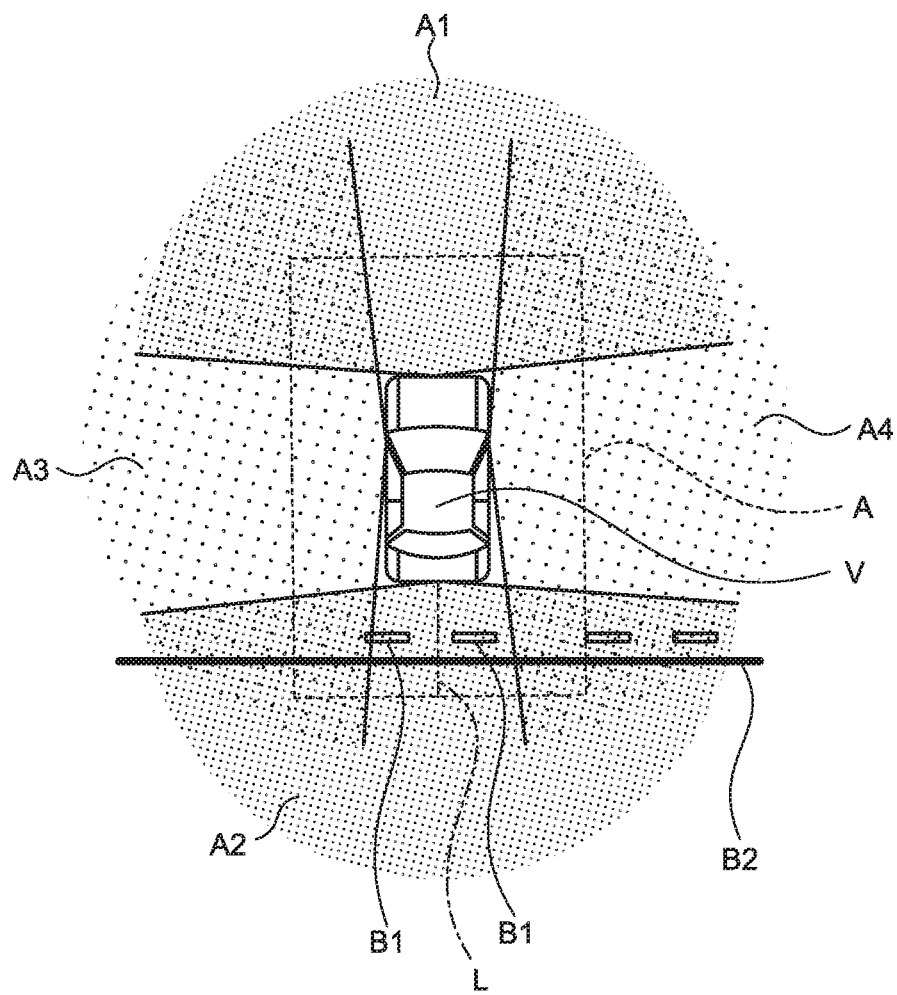

BIRD'S-EYE VIEW VIDEO GENERATION DEVICE, BIRD'S-EYE VIEW VIDEO DISPLAY DEVICE, BIRD'S-EYE VIEW VIDEO GENERATION METHOD, AND NON-TRANSITORY STORAGE MEDIUM

CROSS-REFERENCE TO RELATED APPLICATIONS

This application is a Continuation of PCT International Application No. PCT/JP2018/008416 filed in Japan on Mar. 5, 2018, which claims priority to and incorporates by references the entire contents of Japanese Patent Application No. 2017-073795 filed in Japan on Apr. 3, 2017, Japanese Patent Application No. 2017-098054 filed in Japan on May 17, 2017, and Japanese Patent Application No. 2017-098143 filed in Japan on May 17, 2017.

FIELD

The present application relates to a bird's-eye view video generation device, a bird's-eye view video display device, a bird's-eye view video generation method, and a non-transitory storage medium.

BACKGROUND

When parking a vehicle, a driver orients the vehicle to a reference object, such as a park marking line, a wheel stopper, an edge line, or a curbstone. A technology that relates to a vehicle surroundings display device that, when a vehicle is parked, displays a bird's-eye view video of the vehicle together with an image of the vehicle to assist parking is known (for example, refer to Japanese Laid-open Patent Publication No. 2013-116696 and Japanese Laid-open Patent Publication No. 2008-083990). The technology described in Japanese Laid-open Patent Publication No. 2013-116696 sets, in a car park where white lines are not drawn as boundaries between parking areas on the road surface, a boundary between adjacent parking areas based on a wheel stopper extending in a vehicle lateral direction and displays the boundary in a superimposed manner on a bird's-eye view video. The technology described in Japanese Laid-open Patent Publication No. 2008-083990 displays, when a specified part of a parking frame line is outside a display area, an extension image representing extension the parking frame line in a superimposed manner on a bird's-eye view video.

SUMMARY

The technology described in Japanese Laid-open Patent Publication No. 2013-116696 requires an object representing a boundary between adjacent parking areas, such as a wheel stopper extending in the vehicle lateral direction. The technology described in Japanese Laid-open Patent Publication No. 2008-083990 requires that the parking frame line extends in a vehicle longitudinal direction. For example, when a linear frame line not extending in the vehicle longitudinal direction is present outside the display area, none of the above technologies is applicable. Furthermore, on parking, the relative orientation of the vehicle with respect to reference objects including a park marking line and a wheel stopper varies along with steering operation. In a bird's-eye view video in which the orientation of a vehicle icon is fixed, the orientation of the reference objects varies with respect to the vehicle icon along with the steering operation. For this reason, it may be difficult to promptly determine how to perform the steering operation in order to orient the vehicle to the orientation of the reference object. As described above, in the bird's-eye view video, there is room to make improvement in making a display such that the relative positional relationship between the vehicle and its surroundings can be checked appropriately.

A bird's-eye view video generation device, a bird's-eye view video display device, a bird's-eye view video generation method, and a non-transitory storage medium are disclosed.

According to one aspect, there is provided a bird's-eye view video generation device comprising: a video data acquiring unit configured to acquire video data of surroundings video of a vehicle captured by a video-capturing unit; a bird's-eye view video generator configured to generate a bird's-eye view video that displays a predetermined display area around the vehicle by performing a viewpoint conversion processing and synthesizing processing on the video data of the surroundings videos acquired by the video data acquiring unit with a vehicle icon representing the vehicle; a reference object detector configured to detect at least one reference object around the vehicle; an orientation specifying unit configured to specify a relative orientation of the at least one reference object detected by the reference object detector with respect to the vehicle; a superimposing processor configured to generate a superimposed bird's-eye view video by superimposing information representing the relative orientation of the at least one reference object with respect to the vehicle on the bird's-eye view video generated by the bird's-eye view video generator based on the vehicle icon; and a display controller configured to cause a display to display the superimposed bird's-eye view video generated by the superimposing processor, wherein, when a positional relationship between the at least one reference object and the vehicle meets a predetermined condition, the bird's-eye view video generator is further configured to generate the bird's-eye view video based on the information representing the relative orientation of the at least one reference object with respect to the vehicle instead of the bird's-eye view video based on the vehicle icon.

According to one aspect, there is provided a bird's-eye view video generation method comprising: acquiring video data of surroundings video of a vehicle captured by a video-capturing unit; generating a bird's-eye view video that displays a predetermined display area around the vehicle by performing a viewpoint conversion processing and synthesizing processing on the acquired video data of the surroundings with a vehicle icon representing the vehicle; detecting at least one at least one reference object around the vehicle; specifying a relative orientation of the detected at least one reference object with respect to the vehicle; generating a superimposed bird's-eye view video by superimposing information representing the relative orientation of the at least one reference object with respect to the vehicle on the generated bird's-eye view video based on the vehicle icon; and causing a display to display the generated superimposed bird's-eye view video, wherein, when a positional relationship between the at least one reference object and the vehicle meets a predetermined condition, on generating the bird's-eye view video, generating the bird's-eye view video based on the information representing the relative orientation of the at least one reference object with respect to the vehicle instead of the bird's-eye view video based on the vehicle icon.

According to one aspect, there is provided a non-transitory storage medium that stores a program for causing a computer that operates as a bird's-eye view video generation device to execute a process comprising: acquiring video data of surroundings video of a vehicle captured by a video-capturing unit; generating a bird's-eye view video that displays a predetermined display area around the vehicle by performing a viewpoint conversion processing and synthesizing processing on the acquired video data of the surroundings with a vehicle icon representing the vehicle; detecting at least one reference object around the vehicle; specifying a relative orientation of the detected at least one reference object with respect to the vehicle; generating a superimposed bird's-eye view video by superimposing information representing the relative orientation of the at least one reference object with respect to the vehicle on the generated bird's-eye view video based on the vehicle icon; and causing a display to display the generated superimposed bird's-eye view video, wherein, when a positional relationship between the at least one reference object and the vehicle meets a predetermined condition, on generating the bird's-eye view video, generating the bird's-eye view video based on the information representing the relative orientation of the reference object with respect to the vehicle instead of the bird's-eye view video based on the vehicle icon.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 8 is a diagram illustrating still another exemplary superimposed bird's-eye view video that is generated by the bird's-eye view video generation device according to the first embodiment.

FIG. 9 is a diagram illustrating still another exemplary superimposed bird's-eye view video that is generated by the bird's-eye view video generation device according to the first embodiment.

FIG. 10 is a diagram illustrating another exemplary positional relationship among the vehicle, the reference object, the display area, and the imaging area in the first embodiment.

DETAILED DESCRIPTION OF THE PREFERRED EMBODIMENTS

With reference to the accompanying drawings, embodiments of a bird's-eye view video generation device 40, a bird's-eye view video display device 1, a bird's-eye view video generation method, and a program will be described in detail below. Note that the following embodiments do not limit the present application.

First Embodiment

Figure 1:
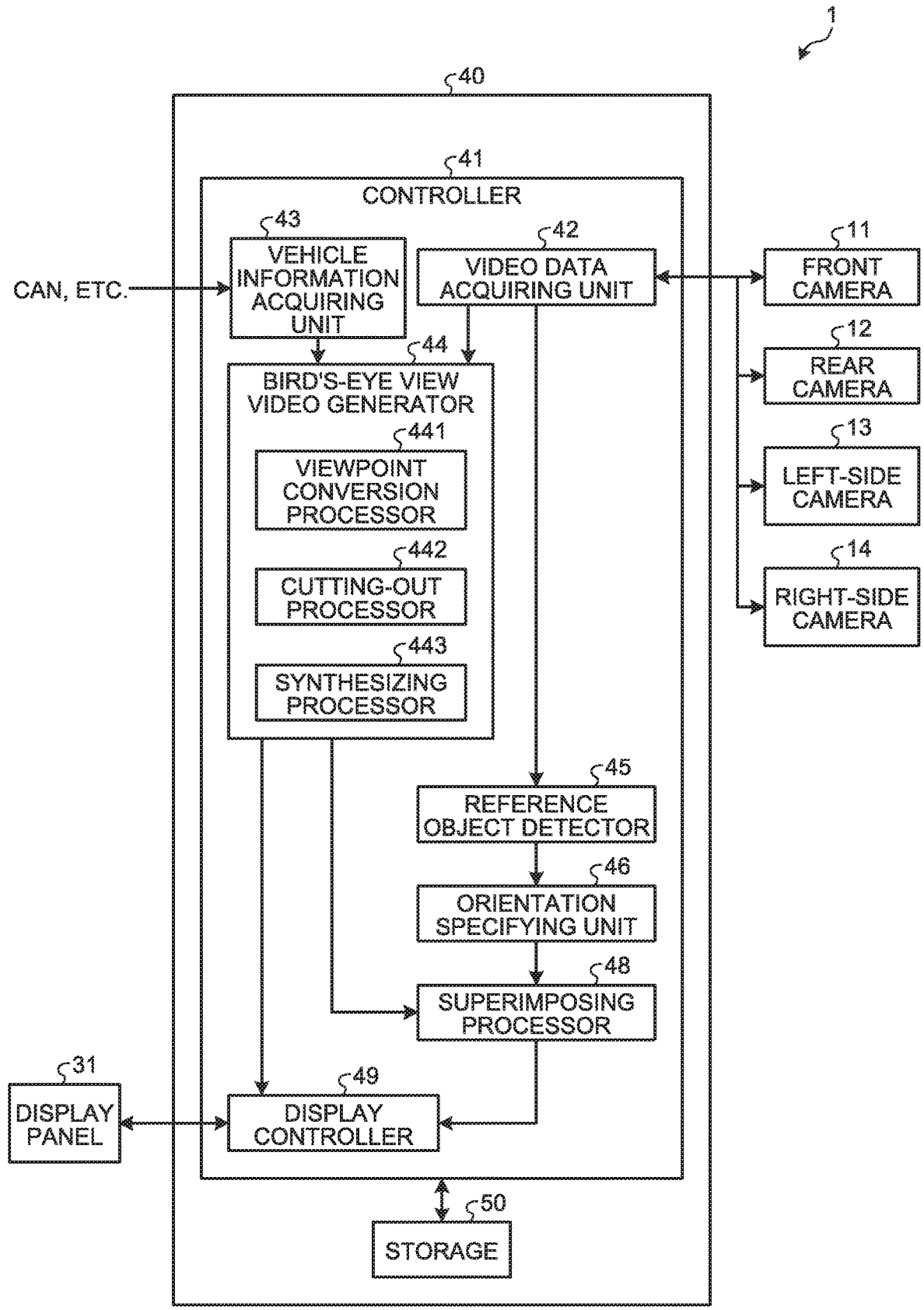
FIG. 1 is a block diagram illustrating an exemplary configuration of a bird's-eye view video generation device according to a first embodiment.

FIG. 1 is a block diagram illustrating an exemplary configuration of a bird's-eye view video generation device according to a first embodiment. The bird's-eye view video display device 1 generates a first bird's-eye view video 100 (refer to FIG. 2). The bird's-eye view video generation device 40 and the bird's-eye view video display device 1 are mounted on a vehicle. The bird's-eye view video generation device 40 and the bird's-eye view video display device 1 may be ones mounted on the vehicle or devices that are portable and usable in the vehicle.

With reference to FIG. 1, the bird's-eye view video display device 1 will be described. The bird's-eye view video display device 1 includes a front camera 11 (an imager), a rear camera 12 (the imager), a left-side camera 13 (the imager), a right-side camera 14 (the imager), a display panel (display) 31, and the bird's-eye view video generation device 40.

The front camera 11 works as a bird's-eye view video camera. The front camera 11 is arranged on a front of the vehicle and captures a video of surroundings around the front of the vehicle. The front camera 11 captures a video of a first imaging area A1 of, for example, approximately 180° (refer to FIG. 6). The first imaging area A1 includes an area in front of the vehicle V wider than that of a display area A of the first bird's-eye view video 100 (refer to FIG. 6). The front camera 11 outputs the captured video to a video data acquiring unit 42 of the bird's-eye view video generation device 40.

The rear camera 12 works as a bird's-eye view video camera. The rear camera 12 is arranged on a rear of the vehicle and captures a video of surroundings around the rear of the vehicle. The rear camera 12 captures a video of a second imaging area A2 of, for example, approximately 180° (refer to FIG. 6). The second imaging area A2 includes an area behind the vehicle V wider than that of the display area A of the first bird's-eye view video 100 (refer to FIG. 6). The rear camera 12 outputs the captured video to the video data acquiring unit 42 of the bird's-eye view video generation device 40.

The left-side camera 13 works as a bird's-eye view video camera. The left-side camera 13 is arranged on a left side of the vehicle and captures a video of surroundings around the left side of the vehicle. The left-side camera 13 captures a video of a third imaging area A3 of, for example, approximately 180° (refer to FIG. 6). The third imaging area A3 includes an area leftward with respect to the vehicle V wider than that of the display area A of the first bird's-eye view video 100. The left-side camera 13 outputs the captured video to the video data acquiring unit 42 of the bird's-eye view video generation device 40.

The right-side camera 14 works as a bird's-eye view video camera. The right-side camera 14 is arranged on a right side of the vehicle and captures a video of surroundings around the right side of the vehicle. The right-side camera 14 captures a video of, for example, a fourth imaging area A4 of approximately 180° (refer to FIG. 6). The fourth imaging area A4 includes an area rightward with respect to the vehicle V wider than that of the display area A of the first bird's-eye view video 100. The right-side camera 14 outputs the captured video to the video data acquiring unit 42 of the bird's-eye view video generation device 40.

The front camera 11, the rear camera 12, the left-side camera 13, and the right-side camera 14 capture videos in all directions for the vehicle.

A display panel 31 is, for example, a display including a liquid crystal display (LCD) or an organic EL (Electro-Luminescence) display. The display panel 31 displays the first bird's-eye view video 100 (refer to FIG. 2) or a superimposed bird's-eye view video 100A (refer to FIG. 3)

based on a video signal output from the bird's-eye view video generation device 40 of the bird's-eye view video display device 1. The display panel 31 may be one dedicated to the bird's-eye view video display device 1 or may be shared with other systems including a navigation system. The display panel 31 is arranged in a position that is easily viewed by a driver.

The bird's-eye view video generation device 40 includes a controller 41 and a storage 50.

The controller 41 is, for example, an arithmetic processing unit that is formed of a central processing unit (CPU), or the like. The controller 41 loads programs stored in the storage 50 and executes commands contained in the programs. The controller 41 includes the video data acquiring unit 42, a vehicle information acquiring unit 43, a bird's-eye view video generator 44, a reference object detector 45, an orientation specifying unit 46, a superimposing processor 48, and a display controller 49. The controller 41 includes an internal memory, which is not illustrated in the drawings, and the internal memory is used to temporarily store data in the controller 41.

The video data acquiring unit 42 acquires surroundings video data obtained by capturing videos of the surroundings of the vehicle. More specifically, the video data acquiring unit 42 acquires sets of video data output from the front camera 11, the rear camera 12, the left-side camera 13 and the right-side camera 14. The video data acquiring unit 42 outputs the acquired video data to the bird's-eye view video generator 44 and the reference object detector 45. The video data acquired from each of the camera is a moving image consisting of, for example, 30 frames per second.

The vehicle information acquiring unit 43 acquires vehicle information representing a situation of the vehicle which serves as a trigger to start displaying a bird's-eye view video, such as gear operation information on the vehicle, from a CAN (Controller Area Network) and various sensors that detect a state of the vehicle. The vehicle information acquiring unit 43 acquires, for example, a reverse trigger. The vehicle information acquiring unit 43 acquires, for example, vehicle speed information. The vehicle information acquiring unit 43 outputs the acquired vehicle information to the bird's-eye view video generator 44.

The bird's-eye view video generator 44 performs a viewpoint conversion processing and a synthesizing processing such that the vehicle is looked down from above with a vehicle icon 110 representing the vehicle based on surroundings videos acquired by the video data acquiring unit 42, thereby generating the first bird's-eye view video 100 that displays the predetermined display area A for the vehicle V. More specifically, the bird's-eye view video generator 44 generates the first bird's-eye view video 100 based on the videos captured by the front camera 11, the rear camera 12, the left-side camera 13, and the right-side camera 14. The method of generating the first bird's-eye view video 100 may be any known method and is not limited. The bird's-eye view video generator 44 outputs the generated first bird's-eye view video 100 to the superimposing processor 48 and the display controller 49.

The bird's-eye view video generator 44 includes a viewpoint conversion processor 441, a cutting-out processor 442, and a synthesizing processor 443.

The viewpoint conversion processor 441 performs a viewpoint conversion processing on the surroundings video data acquired by the video data acquiring unit 42 such that the vehicle V is looked down from above. More specifically, the viewpoint conversion processor 441 generates a video by performing the viewpoint conversion processing based on the surroundings video data captured by the front camera 11, the rear camera 12, the left-side camera 13, and the right-side camera 14. The method of the viewpoint conversion processing may be any known method and is not limited. The viewpoint conversion processor 441 outputs the surroundings video data on which the viewpoint conversion processing has been performed to the cutting-out processor 442.

The cutting-out processor 442 performs a cutting-out processing of cutting a video in a predetermined area out of the surroundings video data on which the viewpoint conversion processing has been performed. An area to be cut-out is previously registered and stored. The cutting-out processor 442 outputs the video data of the videos on which the cutting-out processing has been performed to the synthesizing processor 443.

The synthesizing processor 443 performs a synthesizing processing of synthesizing the video data on which the cutting-out processing has been performed. The synthesizing processor 443 generates the first bird's-eye view video 100 in which the vehicle icon 110 is displayed on the synthesized video.

The reference object detector 45 detects a reference object B that is present away from the display area A around the vehicle. The reference object detector 45 performs an object recognition processing on the surroundings video acquired by the video data acquiring unit 42 and detects the reference object B that is present away from the display area A. The reference object detector 45 may detect, as the reference object B, a captured object in the video with a length equal or more than a predetermined length by performing an edge detection processing. The reference object detector 45 may detect the reference object B from the surroundings video using a recognition dictionary in which the reference object B is stored. For the object recognition processing, a known white line detection processing or a processing of detecting a specific object using the recognition dictionary may be used or both of them may be used.

The reference object B is an object with a length equal or more than a predetermined length and which works as a reference for orienting the vehicle on parking. The reference object B is, for example, a curbstone, a wheel stopper, a park marking line, an edge line, or a line drawn on the road surface. The reference object B has an orientation. In other words, the reference object B is present on a straight line along a predetermined direction. The reference object B extends straightly along the predetermined direction without bending or curbing. The object recognition processing detects an object with a condition for the reference object B.

When the reference object detector 45 detects multiple reference objects B, the reference object detector 45 may regard one with a shorter distance from the vehicle V as the reference object B. Alternatively, when the reference object detector 45 detects multiple reference objects B, the reference object detector 45 may choose the reference object B that is present in the direction in which the vehicle V travels. In this case, the reference object detector 45 detects the reference object B from the surroundings video in the direction in which the vehicle V travels. Alternatively, when the reference object detector 45 detects multiple reference objects B, the reference object detector 45 may regard one with greater linear continuity as the reference object B. Alternatively, when the reference object detector 45 detects, for example, a U-shaped parking frame line, the reference object detector 45 may regard a back frame line as the reference object B.

The surroundings video in the direction in which the vehicle V travels is video data output by at least one of the front camera 11, the rear camera 12, the left-side camera, and the right-side camera 14 oriented to the direction in which the vehicle V travels. For example, when the direction in which the vehicle V travels is the backward direction, the surroundings video in the direction in which the vehicle V travels is the video data captured by the rear camera 12 and the video data for the side rear areas of the vehicle in the video data captured by the left-side camera 13 and the right-side camera 14.

For the surroundings video in the direction in which the vehicle V travels, video data output by the camera oriented to a direction in which a contact with the vehicle is much more likely to occur may be prioritized. For example, when the direction in which the vehicle V travels is the backward direction, the video data captured by the rear camera 12 may be more prioritized than the video data for the side rear areas of the vehicle in the video data captured by the left-side camera 13 and the right-side camera 14. Alternatively, for example, when the direction in which the vehicle V travels is the backward direction and the vehicle V is steered, the video data captured by the rear camera 12 may be prioritized first, the video data for the side rear area of the vehicle in the video data captured by the left-side camera 13 or the right-side camera 14 in a steering direction may be prioritized second, and the video data of the side rear area of the vehicle in the video data captured by the right-side camera 14 or the left-side camera 13 in a direction opposite to the steering direction may be prioritized third.

The orientation specifying unit 46 specifies a relative orientation of the reference object B that is detected by the reference object detector 45 with respect to the vehicle V. More specifically, the orientation specifying unit 46 specifies a relative orientation with respect to the vehicle V from an orientation and a position of the reference object B, which is detected by the reference object detector 45, in the video data. For example, the orientation specifying unit 46 may specify the relative orientation with respect to the vehicle V based on the orientation and the position of the reference object B, which is detected by the reference object detector 45, in the video data and the orientation of an optical axis of the camera that captures the video data. For example, the orientation specifying unit 46 may specify the relative orientation with respect to the vehicle V based on the orientation and the position of the reference object B, which is detected by the reference object detector 45, in the video data and the orientation of the captured object in the video data. The relative orientation with respect to the vehicle V is a relative orientation with respect to a direction L extending in the longitudinal direction of the vehicle. In the present embodiment, the relative orientation of the reference object B with respect to the vehicle corresponds to an angle $\theta$ that is formed by the direction in which the reference object B extends and the direction L extending in the longitudinal direction of the vehicle.

The superimposing processor 48 generates the superimposed bird's-eye view video 100A by superimposing, as the relative orientation based on the vehicle icon 110, information representing the relative orientation of the reference object B with respect to the vehicle V on the first bird's-eye view video 100 that is generated by the bird's-eye view video generator 44. In the present embodiment, the superimposing processor 48 generates the superimposed bird's-eye view video 100A in which the information representing the relative orientation of the reference object B with respect to the vehicle V, which is detected by the orientation specifying unit 46, is represented by a reference orientation icon (information representing the orientation) 120 and the reference orientation icon 120 is superimposed on the first bird's-eye view video 100. More specifically, the superimposing processor 48 superimposes the reference orientation icon 120 such that the angle formed by the reference orientation icon 120 and the direction L extending in the longitudinal direction of the vehicle corresponds to $\theta$ in the superimposed bird's-eye view video 100A.

The reference orientation icon 120 is an icon that presents the orientation of the reference object B. In the present embodiment, the reference orientation icon 120 is a dotted line that extends along the direction in which the reference object B extends.

The superimposing processor 48 superimposes the reference orientation icon 120 on a side where the reference object B is present with respect to the vehicle icon 110 in the first bird's-eye view video 100. For example, when the reference object B is detected behind the vehicle V, the superimposing processor 48 superimposes the reference orientation icon 120 on a rear video 102 behind the vehicle icon 110 in the first bird's-eye view video 100. More specifically, for example, when the reference object B is detected behind the vehicle V, the superimposing processor 48 may superimpose the reference orientation icon 120 based on a center of the rear video 102, in other words, such that the reference orientation icon 120 passes through the center of the rear video 102. For example, when the reference object B is detected behind the vehicle V, the superimposing processor 48 may superimpose the reference orientation icon 120 such that the reference orientation icon 120 passes through only the rear video 102. For example, when the reference object B is detected behind the vehicle V, the superimposing processor 48 may superimpose the reference orientation icon 120 such that the reference orientation icon 120 passes through a position that is distant by a predetermined distance from an end of the vehicle icon 110 in the travel direction.

Alternatively, the superimposing processor 48 may superimpose the reference orientation icon 120 based on a center of the vehicle icon 110, in other words, such that the reference orientation icon 120 passes through the center of the vehicle icon 110.

The display controller 49 causes the display panel 31 to display the first bird's-eye view video 100 or the superimposed bird's-eye view video 100A generated by the superimposing processor 48.

Figure 2:
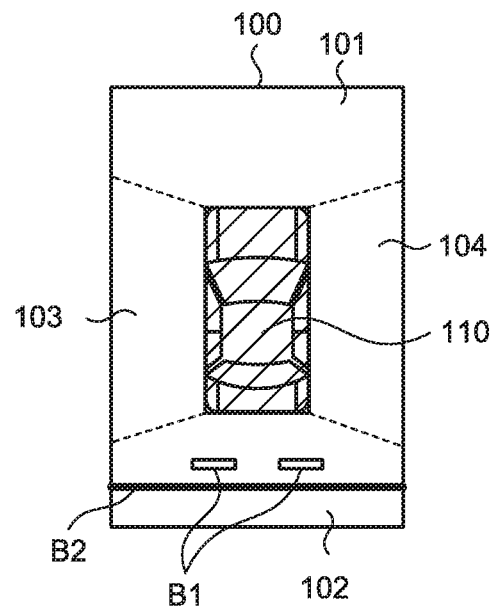
FIG. 2 is a diagram illustrating an exemplary bird's-eye view video that is generated by the bird's-eye view video generation device according to the first embodiment.
Figure 3:
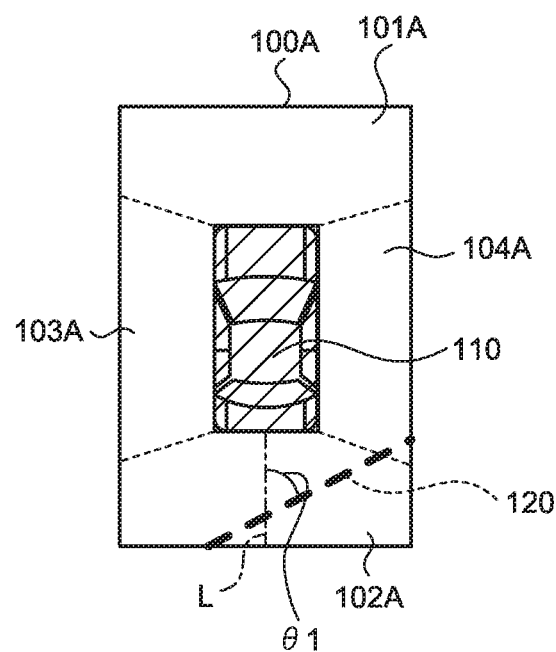
FIG. 3 is a diagram illustrating an exemplary superimposed bird's-eye view video that is generated by the bird's-eye view video generation device according to the first embodiment.
Figure 4:
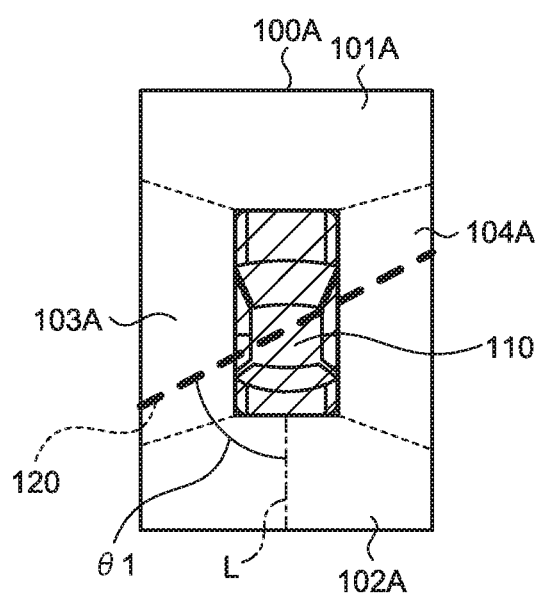
FIG. 4 is a diagram illustrating another exemplary superimposed bird's-eye view video that is generated by the bird's-eye view video generation device according to the first embodiment.

Using FIGS. 2 to 4, the first bird's-eye view video 100 and the superimposed bird's-eye view video 100A generated by the bird's-eye view video display device 1 will be described. FIG. 2 is a diagram illustrating an exemplary bird's-eye view video that is generated by the bird's-eye view video generation device according to the first embodiment. FIG. 3 is a diagram illustrating an exemplary superimposed bird's-eye view video that is generated by the bird's-eye view video generation device according to the first embodiment. FIG. 4 is a diagram illustrating another exemplary superimposed bird's-eye view video that is generated by the bird's-eye view video generation device according to the first embodiment.

Using FIG. 2, the first bird's-eye view video 100 will be described. The first bird's-eye view video 100 has a shape of a portrait rectangle. The first bird's-eye view video 100 includes a front video 101, the rear video 102, a left-side video 103, a right-side video 104, and the vehicle icon 110 that is positioned at a center surrounded by the front video 101, the rear video 102, the left-side video 103, and the right-side video 104. On the rear video 102, a wheel stopper B1 and a rear frame line B2 are displayed as captured objects in the video. The front video 101, the rear video 102, the left-side video 103, the right-side video 104, and the vehicle icon 110 may be sectioned by frame boundaries. The vehicle icon 110 represents the position and the orientation of the vehicle V. The vehicle icon 110 is arranged at the center with its longitudinal direction being parallel with a longitudinal direction of the first bird's-eye view video 100. The driver can know the positions and orientations of the wheel stopper B1 and the rear frame line B2. Accordingly, the driver steers the vehicle V according to the wheel stopper B1 and the rear frame line B2.

In FIG. 2, the oblique dotted lines representing the boundaries between the front video 101, the rear video 102, the left-side video 103, and the right-side video 104 are illustrated for explanation. However, practically, the dotted lines need not be displayed on the first bird's-eye view video 100 that is displayed on the display panel 31. The same applies to other drawings.

Using FIG. 3, the superimposed bird's-eye view video 100A will be described. The superimposed bird's-eye view video 100A has a shape of a portrait rectangle as the first bird's-eye view video does. The superimposed bird's-eye view video 100A includes, as the first bird's-eye view video 100 does, a front video 101A, a rear video 102A, a left-side video 103A, a right-side video 104A, the vehicle icon 110, and the superimposed reference orientation icon 120. The reference orientation icon 120 is superimposed on the rear video 102A. The reference orientation icon 120 represents the orientation, for example, for the rear frame line B2 as the reference object B. The reference orientation icon 120 allows the driver to know the presence of the reference object B along the orientation of the reference orientation icon 120 in the direction in which the vehicle travels. Accordingly, the driver steers the vehicle V according to the reference orientation icon 120.

Using FIG. 4, the superimposed bird's-eye view video 100A will be described. The superimposed bird's-eye view video 100A is different from the superimposed bird's-eye view video 100A illustrated in FIG. 3 in that the reference orientation icon 120 is superimposed such that the reference orientation icon 120 passes through the center of the vehicle icon 110.

The storage 50 stores data necessary for various types of processing in the bird's-eye view video generation device 40 and results of the various types of processing. The storage 50 is, for example, a semiconductor memory device, such as a RAM (Random Access Memory), a ROM (Read Only Memory) or a flash memory, or a storage device, such as a hard disk device or an optical disk.

Figure 5:
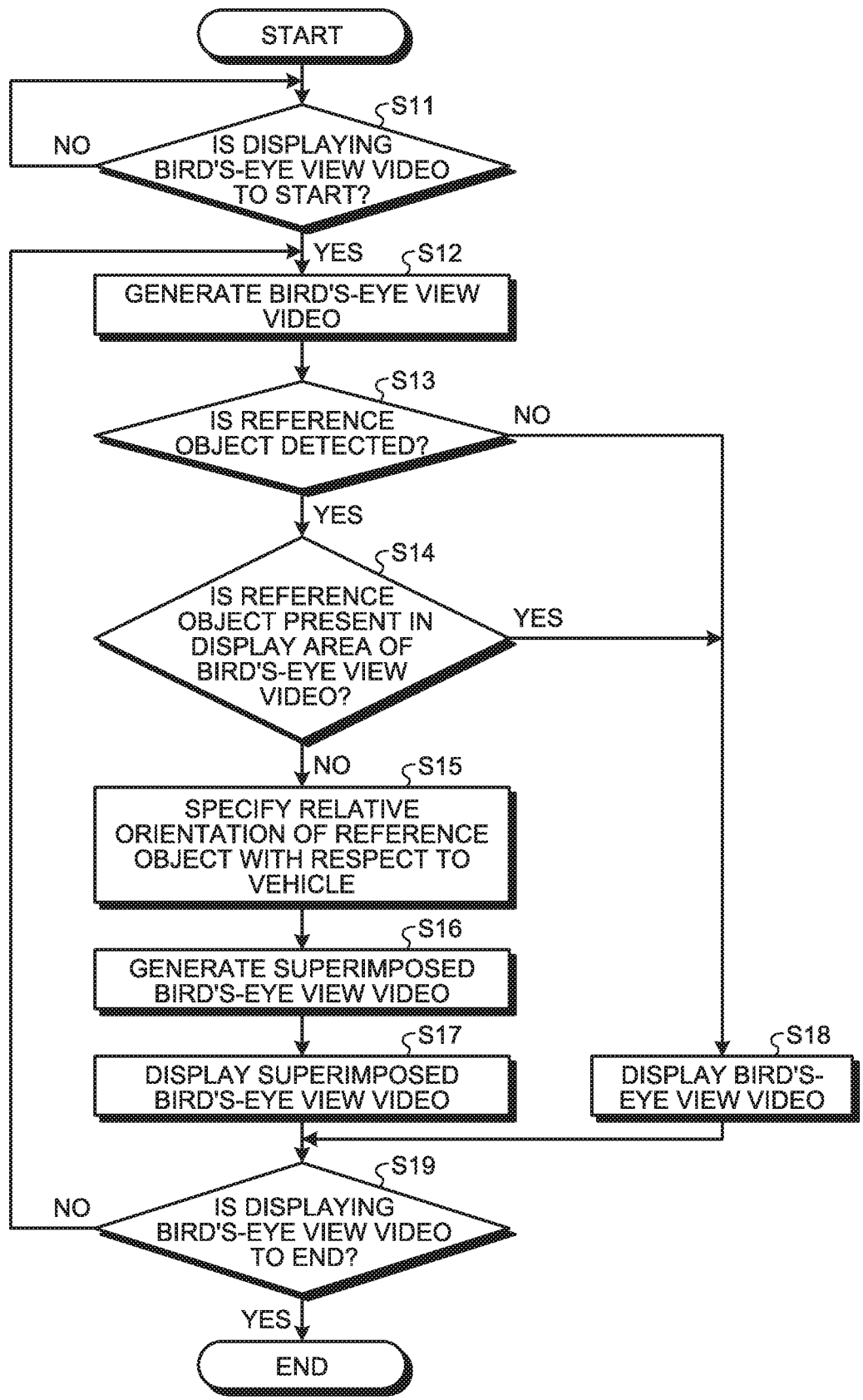
FIG. 5 is a flowchart illustrating a flow of processes in the bird's-eye view video generation device according to the first embodiment.

Using FIG. 5, a flow of processes in the bird's-eye view video generation device 40 will be described. FIG. 5 is a flowchart illustrating a flow of processes in the bird's-eye view video generation device according to the first embodiment.

The controller 41 determines whether to start displaying a bird's-eye view video (step S11). As an example of determining whether to start displaying a bird's-eye view video, the controller 41 determines whether to start displaying a bird's-eye view video based on presence or absence of a reverse trigger. The reverse trigger refers to, for example, a situation where the shift position is changed to a "reverse" position. Alternatively, the reverse trigger refers to a situation where a direction in which vehicle travels is the backward direction in the longitudinal direction of the vehicle. When the reverse trigger is absent, the controller 41 determines not to start displaying a bird's-eye view video (NO at step S11) and executes the process of step S11 again. When the reverse trigger is present, the controller 41 determines to start displaying a bird's-eye view video (YES at step S11) and proceeds to step S12.

The controller 41 generates and displays the first bird's-eye view video 100 (step S12). More specifically, the controller 41 causes the bird's-eye view video generator 44 to generate the first bird's-eye view video 100 by performing a viewpoint conversion such that the vehicle is looked down from above from the surroundings videos acquired by the video data acquiring unit 42. The controller 41 proceeds to step S13.

The controller 41 determines whether the reference object B is detected (step S13). More specifically, the controller 41 determines whether the reference object detector 45 detects the reference object B. When it is determined that the reference object detector 45 detects the reference object B (YES at step S13), the controller 41 proceeds to step S14. When it is determined that the reference object detector 45 does not detect the reference object B (NO at step S13), the controller 41 proceed to step S18.

The controller 41 determines whether the reference object B is present in the display area A of the first bird's-eye view video 100 (step S14). More specifically, the controller 41 determines whether the position at which the reference object B is detected by the reference object detector 45 is contained in the display area A of the first bird's-eye view video 100. When it is determined that the reference object B is contained in the display area A of the first bird's-eye view video 100 (YES at step S14), the controller 41 proceeds to step S18. When it is determined that the reference object B is not contained in the display area A of the first bird's-eye view video 100 (NO at step S14), the controller 41 proceeds to step S15.

The controller 41 specifies a relative orientation of the reference object (step S15). More specifically, the controller 41 causes the orientation specifying unit 46 to specify a relative orientation of the reference object with respect to the vehicle V from the orientation and the position of the reference object B, which is detected by the reference object detector 45, in the video data. The controller 41 proceeds to step S16.

The controller 41 generates the superimposed bird's-eye view video 100A (step S16). More specifically, the controller 41 causes the superimposing processor 48 to generate the superimposed bird's-eye view video 100A by superimposing the reference orientation icon 120 as the relative orientation based on the vehicle icon 110 on the first bird's-eye view video 100, which is generated by the bird's-eye view video generator 44. The controller 41 causes the superimposing processor 48 to superimpose the reference orientation icon 120 on the side where the reference object B is present with respect to the vehicle icon 110 in the first bird's-eye view video 100. Alternatively, the controller 41 may cause the superimposing processor 48 to superimpose the reference orientation icon 120 such that the reference orientation icon 120 passes through the center of the vehicle icon 110. The controller 41 proceeds to step S17.

The controller 41 displays the superimposed bird's-eye view video 100A (step S17). More specifically, the controller 41 causes the display controller 49 to display the superimposed bird's-eye view video 100A, which is generated by the superimposing processor 48, on the display panel 31. The controller 41 proceeds to step S19.

The controller 41 displays the first bird's-eye view video 100 (step S18). More specifically, the controller 41 causes the display controller 49 to cause the display panel 31 to display the first bird's-eye view video 100, which is generated by the bird's-eye view video generator 44. The controller 41 proceeds to step S19.

The controller 41 determines whether to end displaying the bird's-eye view video (step S19). More specifically, the controller 41 determines whether to end the bird's-eye view video display containing the display of the first bird's-eye view video 100 and the display of the superimposed bird's-eye view video 100A based on based on presence or absence of a reverse end trigger. The reverse end trigger refers to, for example, a situation where the shift position is changed from the "reverse" position to another position. At step S19, the displayed video is the first bird's-eye view video 100 or the superimposed bird's-eye view video 100A. When the reverse end trigger is present, the controller 41 determines to end displaying the first bird's-eye view video 100 or the superimposed bird's-eye view video 100A (YES at step S19) and ends the processes. When the reverse end trigger is absent, the controller 41 determines not to end displaying the first bird's-eye view video 100 or the superimposed bird's-eye view video 100A (NO at step S19) and executes the process of step S12 again.

As described above, when the reference object B is detected away from the display area A in the first bird's-eye view video 100, the bird's-eye view video display device 1 outputs a video signal to cause the display panel 31 to display the superimposed bird's-eye view video 100A obtained by superimposing the reference orientation icon 120. The display panel 31 displays the superimposed bird's-eye view video 100A together with, for example, a navigation screen based on the video signal that is output from the bird's-eye view video display device 1.

Figure 6:
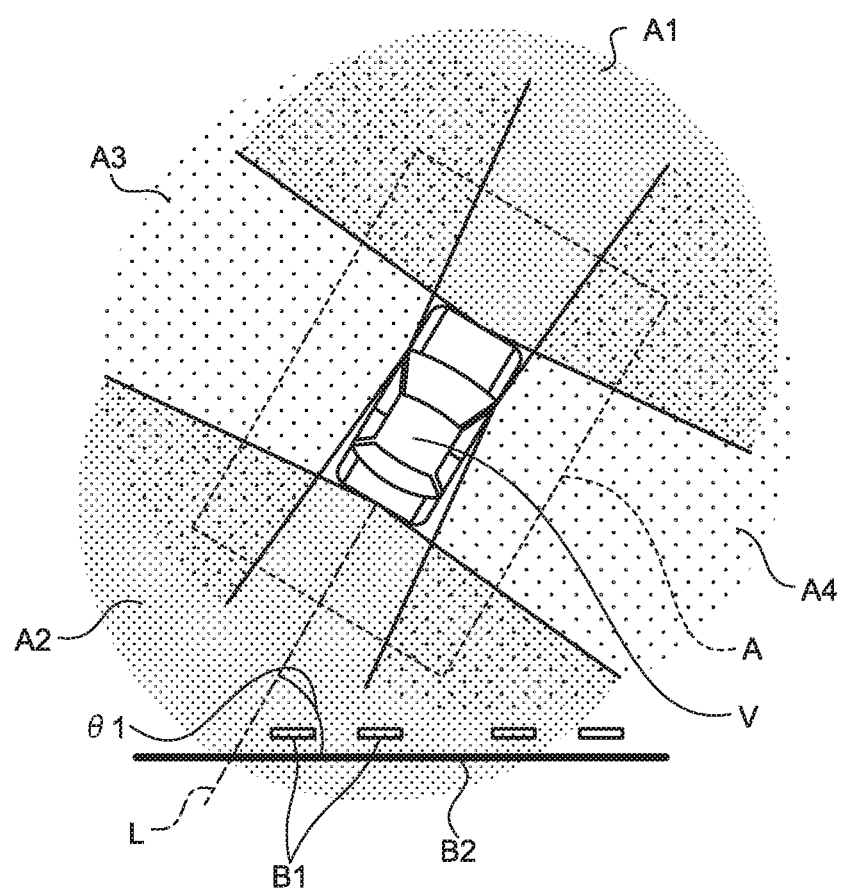
FIG. 6 is a diagram illustrating an exemplary positional relationship among a vehicle, a reference object, a display area, and an imaging area in the first embodiment.
Figure 7:
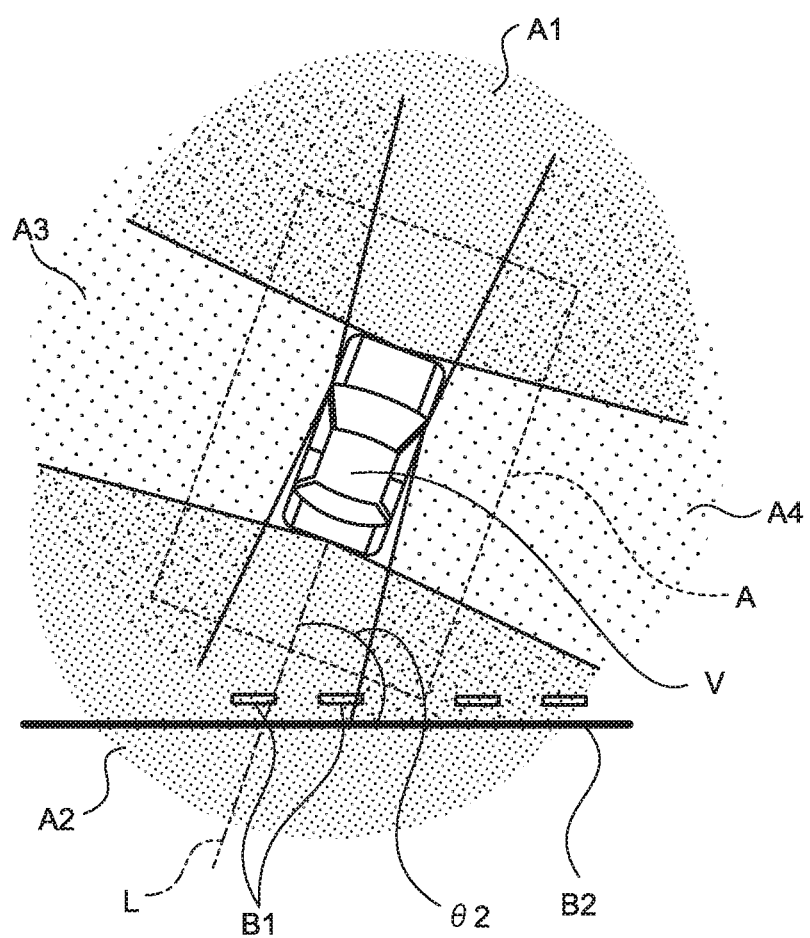
FIG. 7 is a diagram illustrating another exemplary positional relationship among the vehicle, the reference object, the display area, and the imaging area in the first embodiment.

For example, an exemplary case where the wheel stopper B1 and the rear frame line B2 are present behind when the vehicle is reversed will be described using FIGS. 2 to 4 and FIGS. 6 to 10. In the present embodiment, there is no park marking line that sections adjacent parking positions. FIG. 6 is a diagram illustrating an exemplary positional relationship among the vehicle, the reference object, the display area, and the imaging area in the first embodiment. FIG. 7 is a diagram illustrating another exemplary positional relationship among the vehicle, the reference object, the display area, and the imaging area in the first embodiment. FIG. 8 is a diagram illustrating still another exemplary superimposed bird's-eye view video that is generated by the bird's-eye view video generation device according to the first embodiment. FIG. 9 is a diagram illustrating still another exemplary superimposed bird's-eye view video that is generated by the bird's-eye view video that is generated by the bird's-eye view video generation device according to the first embodiment. FIG. 10 is a diagram illustrating another exemplary positional relationship among the vehicle, the reference object, the display area, and the imaging area in the first embodiment.

First of all, the vehicle is positioned near a parking position and the shift position is changed to the "reverse" position. The vehicle information acquiring unit 43 acquires the reverse trigger. As illustrated in FIG. 6, the vehicle V is away from the wheel stopper B1 and the rear frame line B2. The wheel stopper B1 and the rear frame line B2 are present in the first imaging area A2 and are present away from the display area A in the first bird's-eye view video 100. In the present embodiment, the reference object detector 45 regards, as the reference object B, an object that is present in the direction in which the vehicle V travels and that has greater linear continuity. For this reason, in the present embodiment, the rear frame line B2 is regarded as the reference object B. The angle formed by the direction in which the rear frame line B2 as the reference object B extends and the direction L extending in the longitudinal direction of the vehicle is θ1.

At step S11, the controller 41 determines that the reverse trigger is present and determines to start displaying a bird's-eye view video. At step S12, the controller 41 causes the bird's-eye view video generator 44 to generate the first bird's-eye view video 100.

At step S13, the controller 41 determines that, for example, the rear frame line B2 is detected as the reference object B.

At step S14, the controller 41 determines that the reference object B is not present in the display area A of the first bird's-eye view video 100. At step S15, the controller 41 specifies the relative orientation of the reference object B. At step S16, the controller 41 generates the superimposed bird's-eye view video 100A by superimposing the reference orientation icon 120 on the first bird's-eye view video 100. At step S17, the controller 41 causes the display panel 31 to display the generated superimposed bird's-eye view video 100A.

For example, the controller 41 causes the display panel 31 to display the superimposed bird's-eye view video 100A like that illustrated in FIG. 3. The reference orientation icon 120 is superimposed on the rear video 102A. The angle formed by the reference orientation icon 120 and the direction L extending in the longitudinal direction of the vehicle is θ1.

Alternatively, for example, the controller 41 may cause the display panel 31 to display the superimposed bird's-eye view video 100A like that illustrated in FIG. 4. The reference orientation icon 120 is superimposed such that the reference orientation icon 120 passes through the center of the vehicle icon 110. The angle formed by the reference orientation icon 120 and the direction L extending in the longitudinal direction of the vehicle is θ1.

A state, after the state illustrated in FIG. 6, in which the vehicle V moves backward and thus the vehicle V and the reference object B get close to each other is illustrated in FIG. 7. The wheel stopper B1 and the rear frame line B2 are present in the first imaging area A2 and are present away from the display area A of the first bird's-eye view video 100. An angle formed by the direction in which the reference object B extends and the direction L extending in the longitudinal direction of the vehicle is θ2. The angle θ2 is greater than the angle θ1.

At step S13, the controller 41 determines that the reference object B is detected. At step S14, the controller 41 determines that the reference object B is not present in the display area A of the first bird's-eye view video 100. At step S15, the controller 41 specifies the relative orientation of the reference object B. At step S16, the controller 41 generates the superimposed bird's-eye view video 100A by superimposing the reference orientation icon 120 on the first bird's-eye view video 100. At step S17, the controller 41 causes the display panel 31 to display the generated superimposed bird's-eye view video 100A.

For example, the controller 41 causes the display panel 31 to display the superimposed bird's-eye view video 100A like that illustrated in FIG. 8. The reference orientation icon 120 is superimposed on the rear video 102A. The angle formed by the reference orientation icon 120 and the direction L extending in the longitudinal direction of the vehicle is θ2.

Alternatively, for example, the controller 41 causes the display panel 31 to display the superimposed bird's-eye view video 100A like that illustrated in FIG. 9. The reference orientation icon 120 is superimposed such that the reference orientation icon 120 passes through the center of the vehicle icon 110. The angle formed by the reference orientation icon 120 and the direction L extending in the longitudinal direction of the vehicle is θ2.

A state, after the state illustrated in FIG. 7 where the vehicle V moves backward and thus the vehicle V is positioned near the reference object B is illustrated in FIG. 10. The wheel stopper B1 and the rear frame line B2 are present in the first imaging area A2 and are present in the display area A of the first bird's-eye view video 100. An angle that is formed by the direction in which the reference object B extends and the direction L extending in the longitudinal direction of the vehicle is 90°.

At step S13, the controller 41 determines that the reference object B is detected. At step S14, the controller 41 determines that the reference object B is present in the display area A of the first bird's-eye view video 100. At step S18, the controller 41 causes the display panel 31 to display the first bird's-eye view video 100.

For example, the controller 41 causes the display panel 31 to display the first bird's-eye view video 100 like that illustrated in FIG. 2. In the rear video 102, the wheel stopper B1 and the rear frame line B2 are displayed as the captured objects in the video. The video displayed on the display panel 31 is switched from the superimposed bird's-eye view video 100A to the first bird's-eye view video 100 and thus the wheel stopper B1 and the rear frame line B2 are displayed as the captured objects in the video instead of the reference orientation icon 120.

As described above, when the reference object B is detected away from the display area A in the first bird's-eye view video 100, the display panel 31 is caused to display the superimposed bird's-eye view video 100A obtained by superimposing the reference orientation icon 120. As described above, in the present embodiment, it is possible to display the orientation of the reference object B that is away from the display area A in the first bird's-eye view video 100. In the present embodiment, it is possible to appropriately check the relative positional relationship between the vehicle and the surroundings.

In the present embodiment, it is possible to check whether the vehicle V matches the orientation of the reference object B or how much the vehicle V is misaligned with the reference object B. Particularly on parking, it is possible to operate the vehicle V to enable its appropriate orientation while checking whether the vehicle V matches the orientation of the reference object B or how much the vehicle V is misaligned according to a change in the orientation of the reference orientation icon 120 with respect to the vehicle icon 110.

In the present embodiment, the reference orientation icon 120 is superimposed on the side where the reference object B is present with respect to the vehicle icon 110. According to the present embodiment, it is possible to check the direction in which the reference object B is present based on the position in which the reference orientation icon 120 is displayed.

Particularly, the reference orientation icon 120 may be superimposed with respect to the vehicle icon 110 such that the reference orientation icon 120 passes through the center of the video of the side where the reference object B is present. For example, when the reference object B is detected behind the vehicle V, the superimposing processor 48 may superimpose the reference orientation icon 120 such that the reference orientation icon 120 passes through the center of the rear video 102. Displaying the reference orientation icon 120 as described above provides a display in which the relative orientation of the reference object B with respect to the vehicle and the change in the orientation are recognized easily when the orientation of the reference orientation icon 120 with respect to the vehicle icon 110 changes.

In the present embodiment, the reference orientation icon 120 may be superimposed such that the reference orientation icon 120 passes through the center of the vehicle icon 110. According to the present embodiment, since the reference orientation icon 120 are superimposed on the vehicle icon 110 to be displayed, a display in which the orientation of the reference object B with respect to the vehicle are recognized easily are provided.

Second Embodiment

Figure 11:
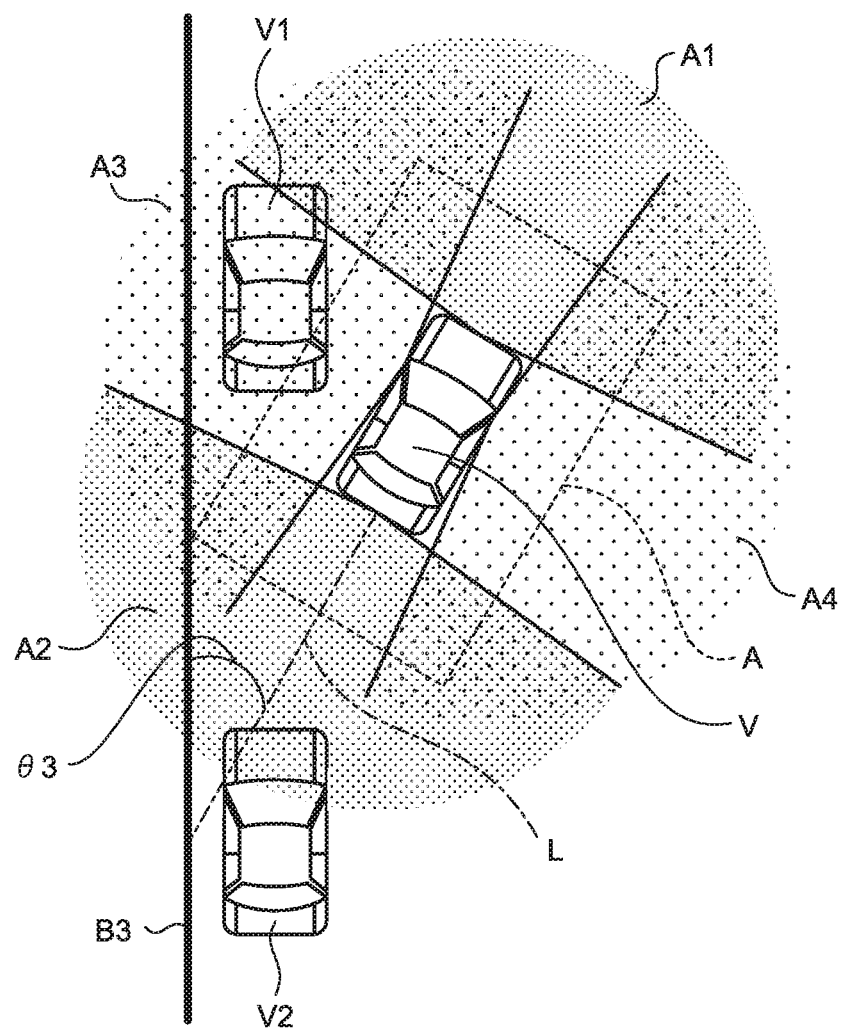
FIG. 11 is a diagram illustrating an exemplary positional relationship among a vehicle, a reference object, a display area, and an imaging area in a second embodiment.
Figure 12:
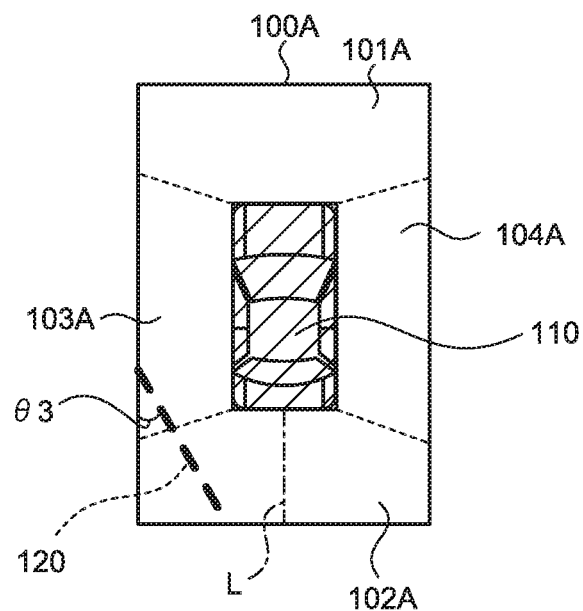
FIG. 12 is a diagram illustrating an exemplary superimposed bird's-eye view video that is generated by a bird's-eye view video generation device according to the second embodiment.
Figure 13:
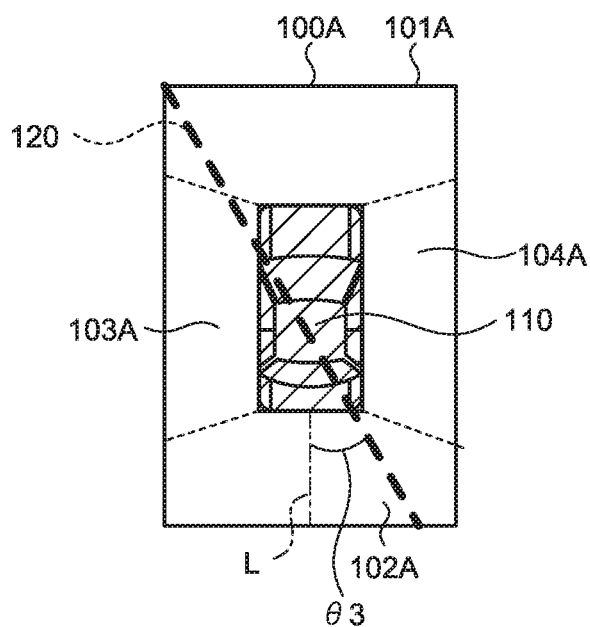
FIG. 13 is a diagram illustrating another exemplary superimposed bird's-eye view video that is generated by the bird's-eye view video generation device according to the second embodiment.
Figure 14:
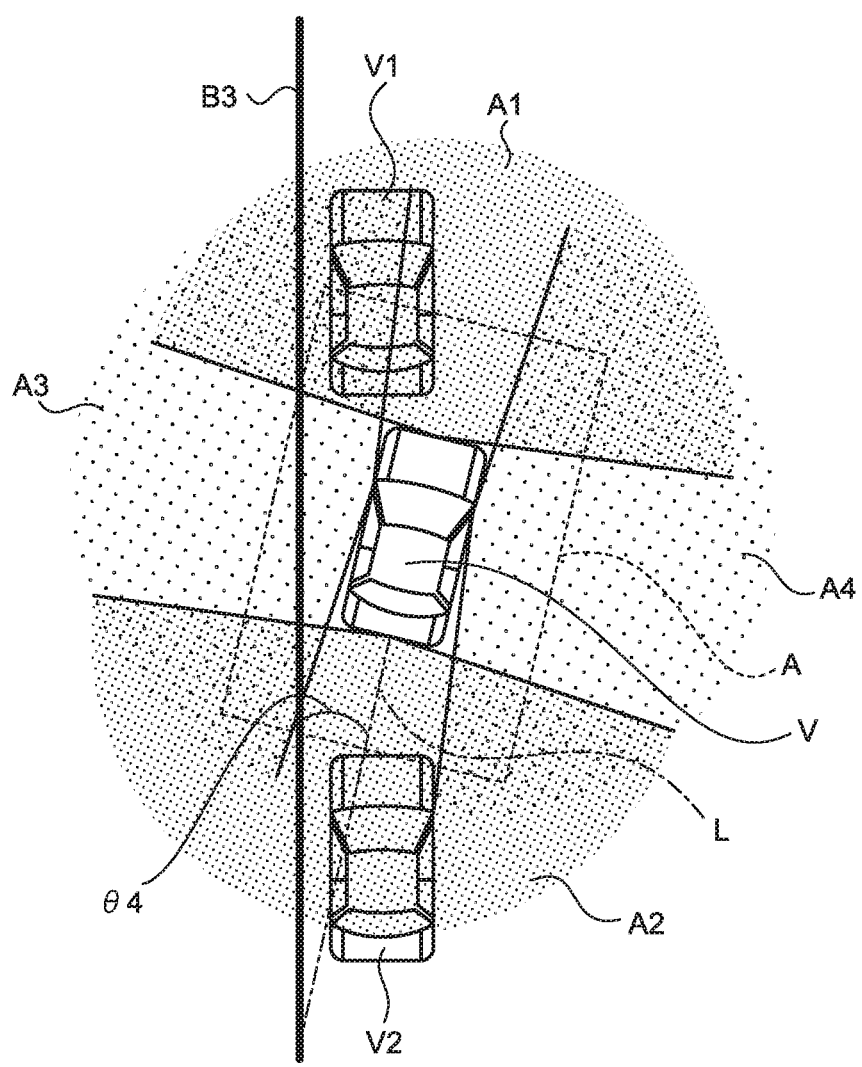
FIG. 14 is a diagram illustrating another exemplary positional relationship among the vehicle, the reference object, the display area, and the imaging area in the second embodiment.
Figure 15:
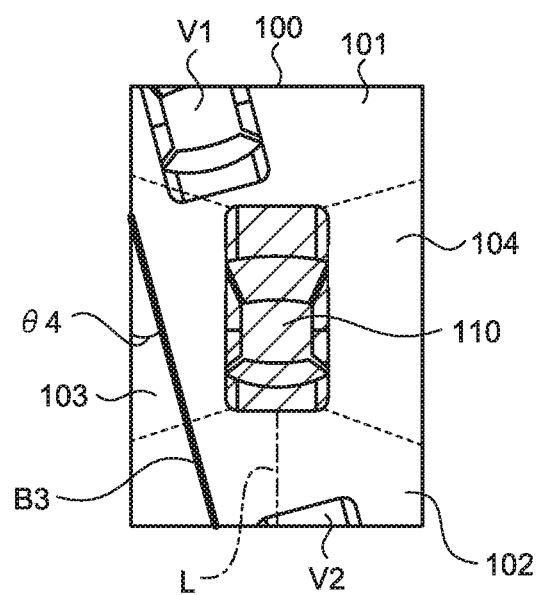
FIG. 15 is a diagram illustrating still another exemplary bird's-eye view video that is generated by the bird's-eye view video generation device according to the second embodiment.

With reference to FIGS. 11 to 15, the bird's-eye view video display device 1 according to the present embodiment will be described. FIG. 11 is a diagram illustrating an exemplary positional relationship among a vehicle, a reference object, a display area, and an imaging area in a second embodiment. FIG. 12 is a diagram illustrating an exemplary superimposed bird's-eye view video that is generated by the bird's-eye view video generation device according to the second embodiment. FIG. 13 is a diagram illustrating another exemplary superimposed bird's-eye view video that is generated by the bird's-eye view video generation device according to the second embodiment. FIG. 14 is a diagram illustrating another exemplary positional relationship among the vehicle, the reference object, the display area, and the imaging area in the second embodiment. FIG. 15 is a diagram illustrating an exemplary bird's-eye view video that is generated by the bird's-eye view video generation device according to the second embodiment. The basic configuration of the bird's-eye view video display device 1 is the same as that of the bird's-eye view video display device 1 of the first embodiment. In the following descriptions, the same components as those of the bird's-eye view video display device 1 are denoted with the same or corresponding reference numbers and detailed descriptions of the components will be omitted.

In the present embodiment, the vehicle V is parked in parallel with an edge line B3 as the reference object B. There are another vehicle V1 and another vehicle V2 with a space in which the vehicle V is to be parked in between.

The reference object detector 45 performs the object recognition processing on the surroundings videos acquired by the video data acquiring unit 42 and detects the edge line B3 as the reference object B that is present away from the display area A.

For example, when the reference object B is detected behind the vehicle V on the left, the superimposing processor 48 superimposes the reference orientation icon 120 on the rear video 102 behind the vehicle icon 110 on the left and the left-side video 103 in the first bird's-eye view video 100. More specifically, for example, when the reference object B is detected behind the vehicle V on the left, the superimposing processor 48 may superimpose the reference orientation icon 120 such that the reference orientation icon 120 passes through the midpoint of the boundary between the rear video 102A and the left-side video 103A. For example, when the reference object B is detected behind the vehicle V on the left, the superimposing processor 48 may superimpose the reference orientation icon 120 such that the reference orientation icon 120 passes through a position away from a rear left end of the vehicle icon 110 by a predetermined distance.

Alternatively, the superimposing processor 48 may superimpose the reference orientation icon 120 such that the reference orientation icon 120 passes through the center of the vehicle icon 110.

For example, an exemplary case in which the edge line B3 as the reference object B is present behind on the left on parallel parking will be described using FIGS. 11 to 15.

First of all, the vehicle is positioned near a parking position and the shift position is changed to the "reverse" position. The vehicle information acquiring unit 43 acquires the reverse trigger. As illustrated in FIG. 11, the vehicle V is away from the edge line B3. The edge line B3 is present over the second imaging area A2 and the third imaging area A3, and is present away from the display area A in the first bird's-eye view video 100. The angle formed by the direction in which the edge line B3 extends and the direction L extending in the longitudinal direction of the vehicle is θ3.

At step S11, the controller 41 determines that the reverse trigger is present and determines to start displaying a bird's-eye view video. At step S12, the controller 41 causes the bird's-eye view video generator 44 to generate the first bird's-eye view video 100.

At step S13, the controller 41 determines that the edge line B3 is detected as the reference object B. At step S14, the controller 41 determines that the reference object B is not present in the display area A in the first bird's-eye view video 100. At step S15, the controller 41 specifies the relative orientation of the edge line B3. At step S16, the controller 41 generates the superimposed bird's-eye view video 100A by superimposing the reference orientation icon 120 on the first bird's-eye view video 100. At step S17, the controller 41 causes the display panel 31 to display the generated superimposed bird's-eye view video 100A.

For example, the controller 41 causes the display panel 31 to display the superimposed bird's-eye view video 100A like that illustrated in FIG. 12. The reference orientation icon 120 is superimposed on the rear video 102A and the left-side video 103A. The angle formed by the reference orientation icon 120 and the direction L extending in the longitudinal direction of the vehicle is θ3.

Alternatively, for example, the controller 41 may cause the display panel 31 to display the superimposed bird's-eye view video 100A like that illustrated in FIG. 13. The reference orientation icon 120 is superimposed such that the reference orientation icon 120 passes through the center of the vehicle icon 110. The angle formed by the reference orientation icon 120 and the direction L extending in the longitudinal direction of the vehicle is θ3. In FIG. 12, the direction L extending in the longitudinal direction of the vehicle is parallel with the left frame line in the superimposed bird's-eye view video 100A and thus the angle θ3 is illustrated as the angle formed by the reference orientation icon 120 and the left frame line.

A state, after the state illustrated in FIG. 11, where the vehicle V moves backward and thus the vehicle V is positioned near the edge line B3 is illustrated in FIG. 14. The edge line B3 is present over the first imaging area A1, the second imaging area A2, and the third imaging area A3, and is present in the display area A in the first bird's-eye view video 100. The other vehicle V1 is present in the display area A and is present in the first imaging area A1. The other vehicle V2 is present in the display area A and is present in the second imaging area A2. An angle formed by the direction in which the edge line B3 extends and the direction L extending in the longitudinal direction of the vehicle is θ4.

At step S13, the controller 41 determines that the edge line B3 is detected. At step S14, the controller 41 determines that the edge line B3 is present in the display area A in the first bird's-eye view video 100. At step S18, the controller 41 causes the display panel 31 to display the first bird's-eye view video 100.

For example, the controller 41 causes the display panel 31 to display the first bird's-eye view video 100 like that illustrated in FIG. 15. In the rear video 102 and the left-side video 103, the edge line B3 is displayed as the captured object in the video. The other vehicle V1 and the other vehicle V2 are displayed. The edge line B3 as the captured object in the video is displayed instead of the reference orientation icon 120 by switching the video displayed on the display panel 31 from the superimposed bird's-eye view video 100A to the first bird's-eye view video 100 displays.

As described above, when the edge line B3 is detected away from the display area A in the first bird's-eye view video 100, the display panel 31 is caused to display the superimposed bird's-eye view video 100A obtained by superimposing the reference orientation icon 120. As described above, in the present embodiment, it is possible to display the orientation of the edge line B3 that is away from the display area A in the first bird's-eye view video 100. In the present embodiment, it is possible to appropriately check the relative positional relationship between the vehicle and its surroundings even on parallel parking.

Third Embodiment

Figure 16:
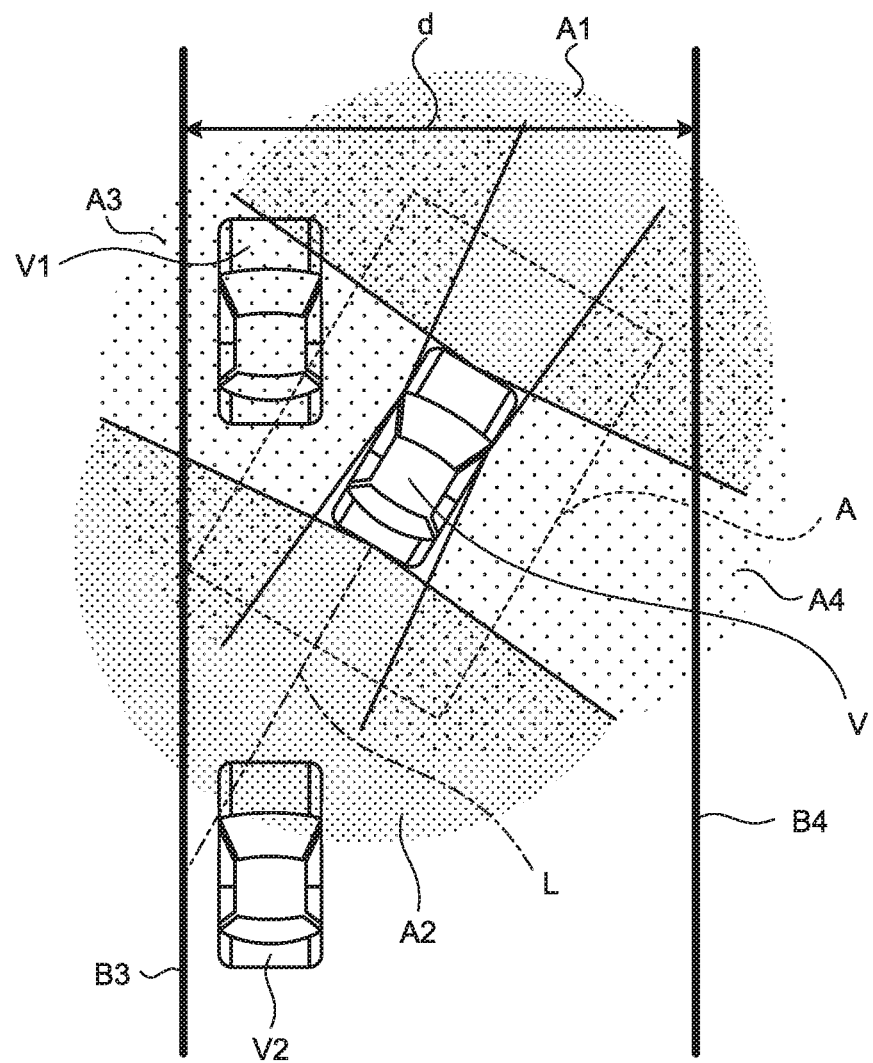
FIG. 16 is a diagram illustrating an exemplary positional relationship among a vehicle, a reference object, a display area, and an imaging area in a third embodiment.

With reference to FIG. 16, the bird's-eye view video display device 1 according to the present embodiment will be described. FIG. 16 is a diagram illustrating an exemplary positional relationship among a vehicle, a reference object, a display area, and an imaging area in a third embodiment.

In the present embodiment, the vehicle V is parked in parallel with the edge line B3 as the reference object B in a narrow road. An edge line B4 that is on the opposite side and is opposed to the edge line B3 is present. The interval between the edge line B3 and the edge line B4 is d. There are the other vehicle V1 and the other vehicle V2 with the space in which the vehicle V is to be parked in between.

The reference object detector 45 performs the object recognition processing on the surroundings videos acquired by the video data acquiring unit 42 and detects the edge line B3 as the reference object B that is present away from the display area A. The edge line B4 is not detected as the reference object B because the edge line B4 is present on the side opposite to the direction in which the vehicle V travels.

Alternatively, the reference object detector 45 performs the object recognition processing on the surroundings videos acquired by the video data acquiring unit 42 and detects the edge line B3 as the reference object B that is present away from the display area A and that is closer to the vehicle V. The edge line B4 is more away from the vehicle V compared to the edge line B3 and thus is not detected as the reference object.

As described above, the reference object detector 45 detects the edge line B3 as the reference object B and accordingly the process along the flowchart is executed as in the second embodiment and the first bird's-eye view video 100 or the superimposed bird's-eye view video 100A is displayed on the display panel 31.

As described above, in the present embodiment, it is possible to appropriately check the positional relationship between the vehicle and its surroundings even on parallel parking in a narrow road.

Fourth Embodiment

Figure 17:
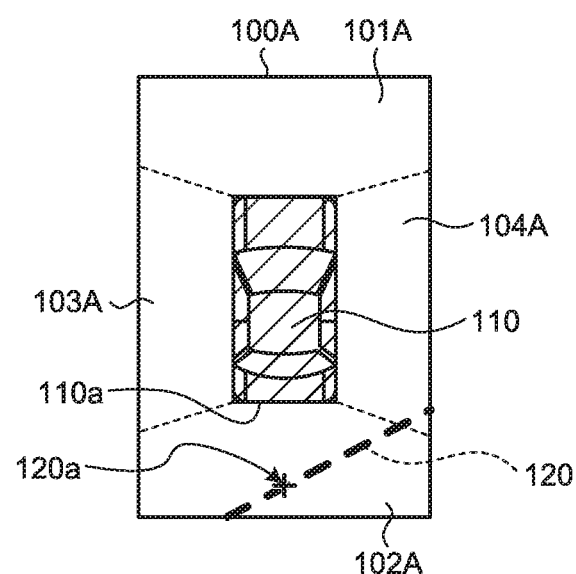
FIG. 17 is a diagram illustrating an exemplary superimposed bird's-eye view video that is generated by a bird's-eye view video generation device according to a fourth embodiment.
Figure 18:
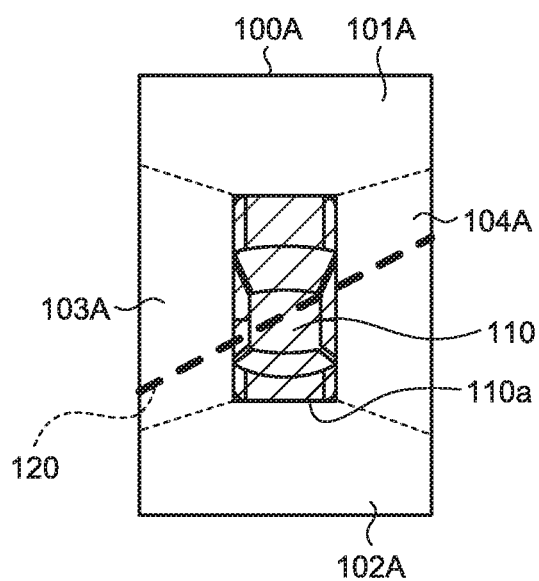
FIG. 18 is a diagram illustrating another exemplary superimposed bird's-eye view video that is generated by the bird's-eye view video generation device according to the fourth embodiment.
Figure 19:
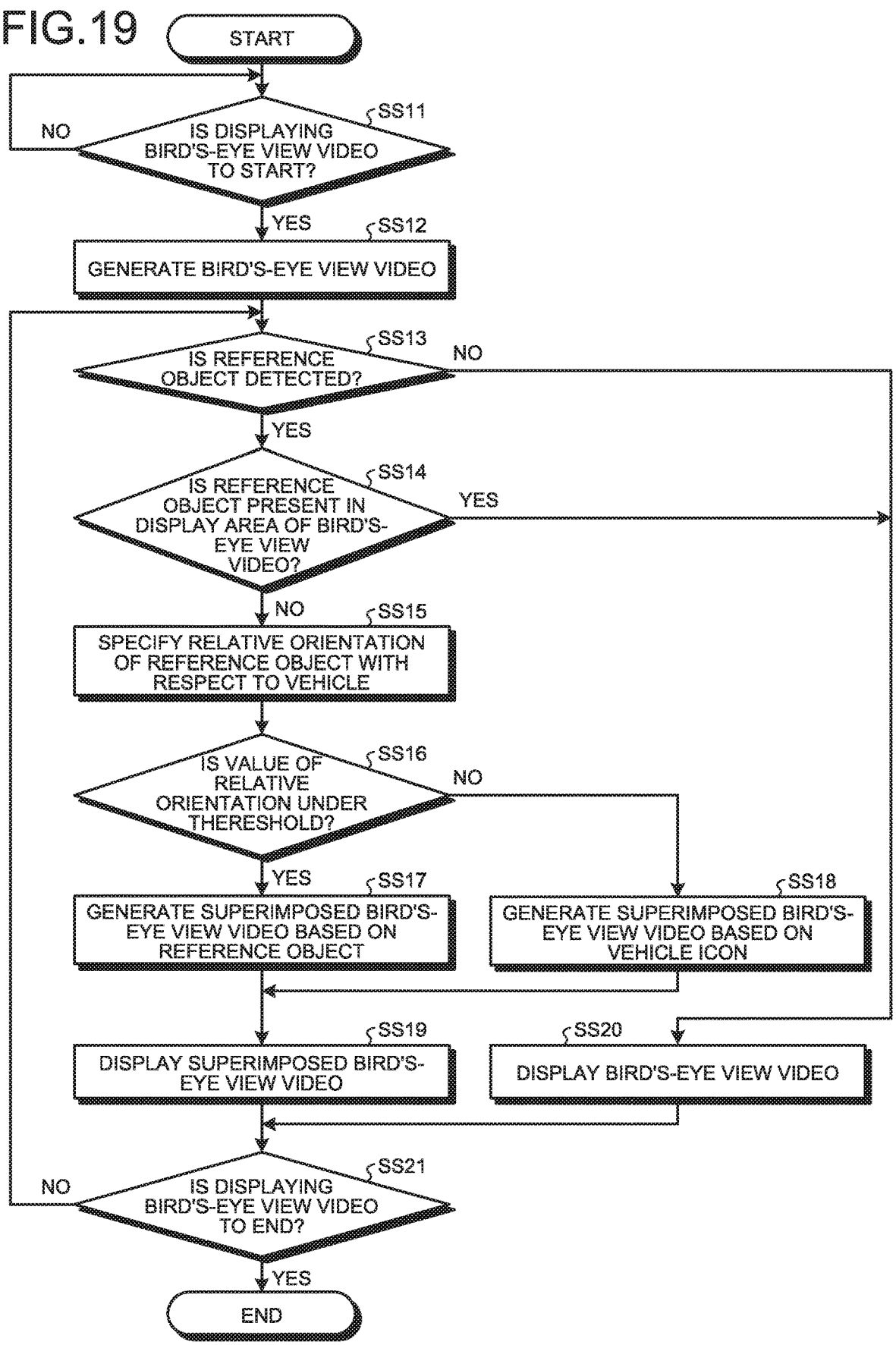
FIG. 19 is a flowchart illustrating a flow of processes in the bird's-eye view video generation device according to the fourth embodiment.
Figure 20:
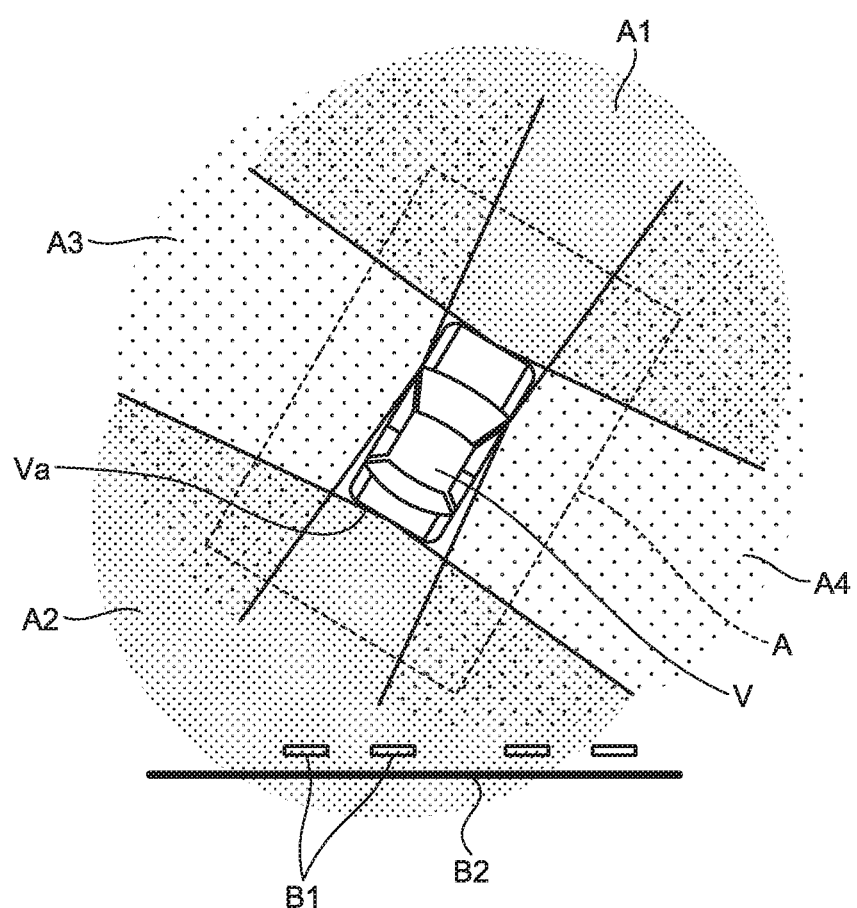
FIG. 20 is a diagram illustrating an exemplary positional relationship among a vehicle, a reference object, a display area, and an imaging area.
Figure 21:
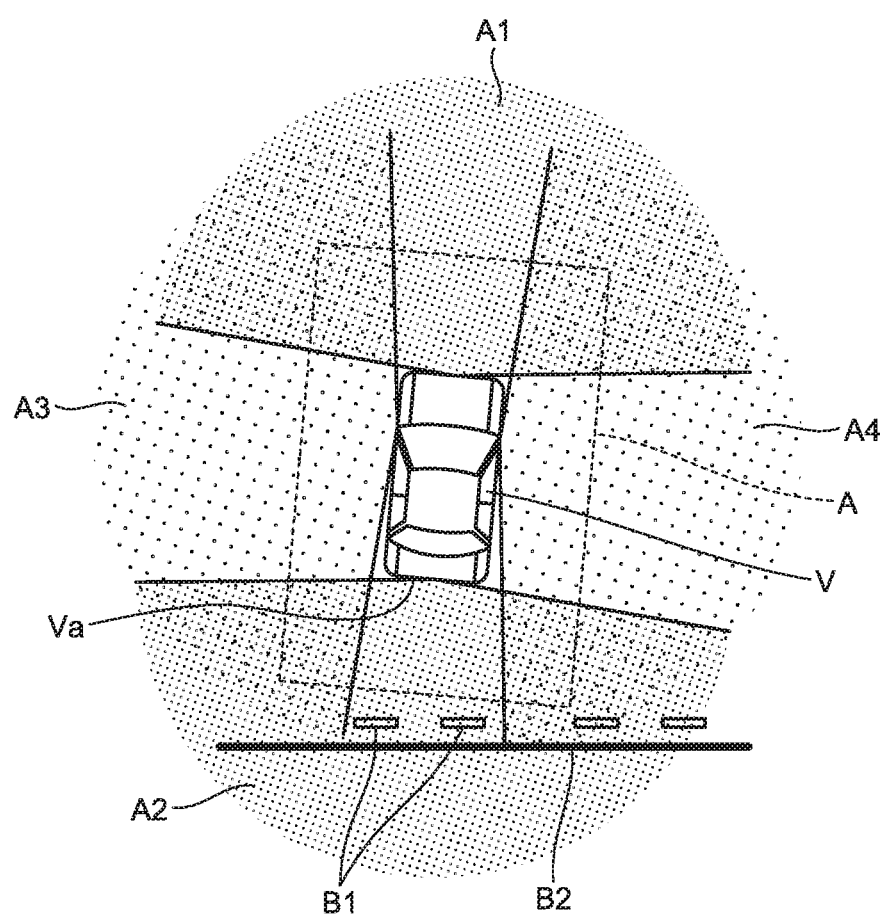
FIG. 21 is a diagram illustrating another exemplary positional relationship among the vehicle, the reference object, the display area, and the imaging area.
Figure 22:
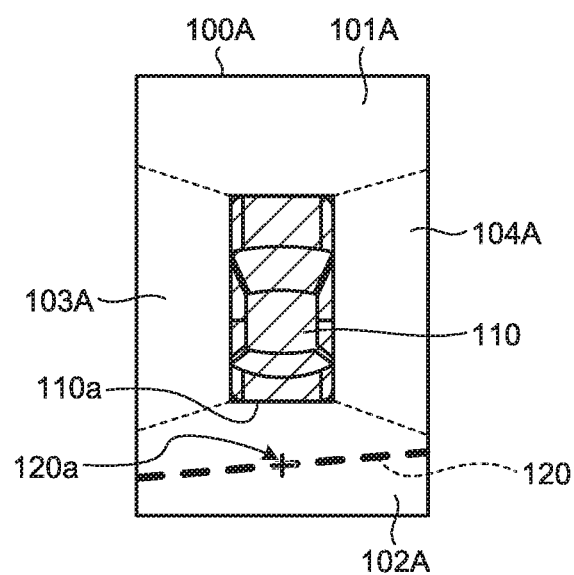
FIG. 22 is a diagram illustrating another exemplary superimposed bird's-eye view video that is generated by the bird's-eye view video generation device according to the fourth embodiment.
Figure 23:
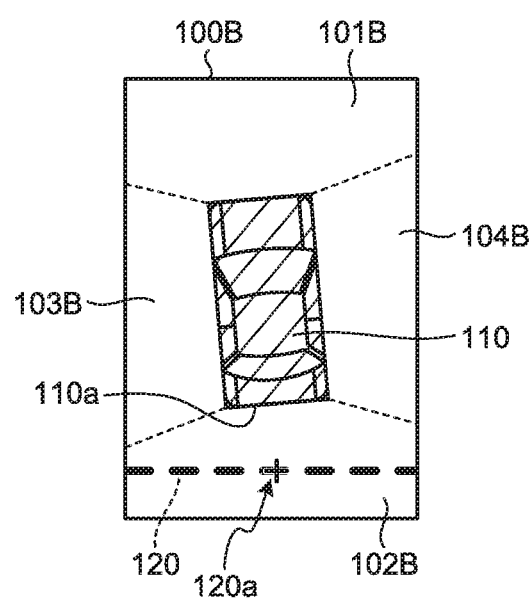
FIG. 23 is a diagram illustrating still another exemplary superimposed bird's-eye view video that is generated by the bird's-eye view video generation device according to the fourth embodiment.
Figure 24:
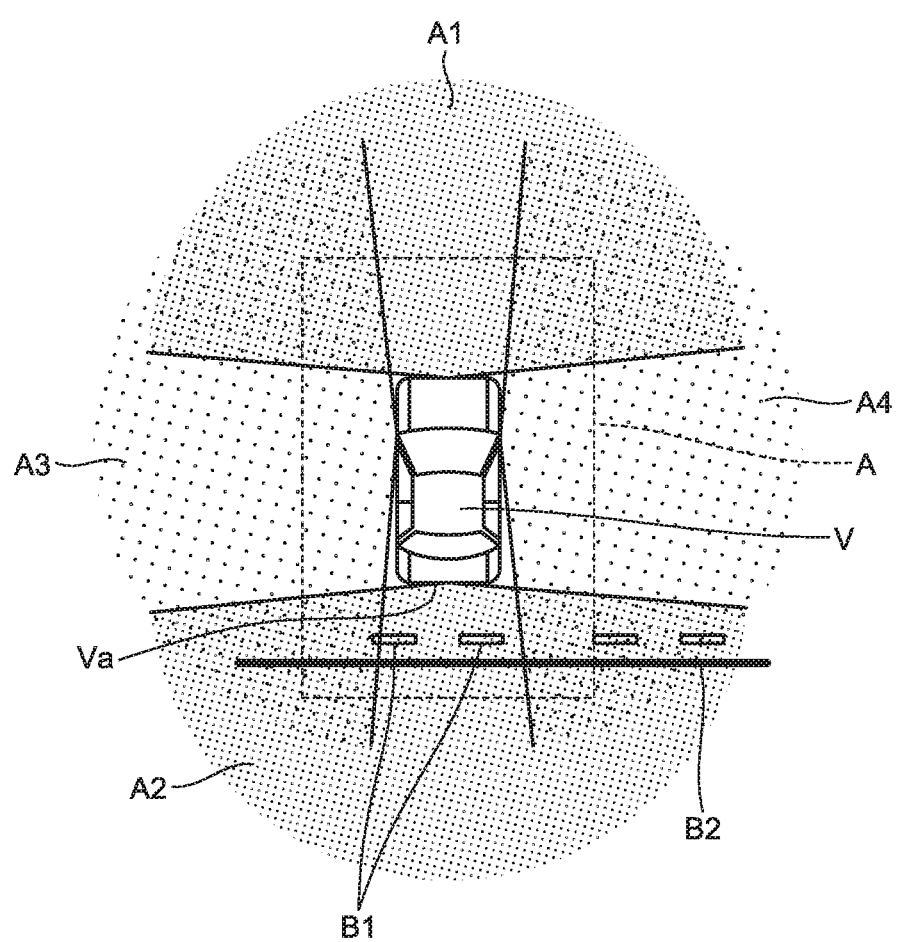
FIG. 24 is a diagram illustrating another exemplary positional relationship among the vehicle, the reference object, the display area, and the imaging area.
Figure 25:
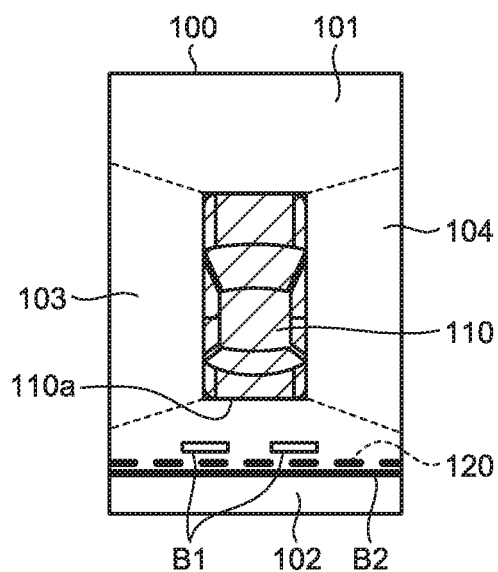
FIG. 25 is a diagram illustrating still another exemplary superimposed bird's-eye view video that is generated by the bird's-eye view video generation device according to the fourth embodiment.

With reference to FIGS. 17 to 25, the bird's-eye view video display device 1 according to the present embodiment will be described. FIG. 17 is a diagram illustrating an exemplary superimposed bird's-eye view video that is generated by the bird's-eye view video generation device according to a fourth embodiment. FIG. 18 is a diagram illustrating another exemplary superimposed bird's-eye view video that is generated by the bird's-eye view video generation device according to the fourth embodiment. FIG. 19 is a flowchart illustrating a flow of processes in the bird's-eye view video generation device according to the fourth embodiment. FIG. 20 is a diagram illustrating an exemplary positional relationship among a vehicle, a reference object, a display area, and an imaging area. FIG. 21 is a diagram illustrating another exemplary positional relationship among the vehicle, the reference object, the display area, and the imaging area. FIG. 22 is a diagram illustrating another exemplary superimposed bird's-eye view video that is generated by the bird's-eye view video generation device according to the fourth embodiment. FIG. 23 is a diagram illustrating still another exemplary superimposed bird's-eye view video that is generated by the bird's-eye view video generation device according to the fourth embodiment. FIG. 24 is a diagram illustrating another exemplary positional relationship among the vehicle, the reference object, the display area, and the imaging area. FIG. 25 is a diagram illustrating still another exemplary superimposed bird's-eye view video that is generated by the bird's-eye view video generation device according to the fourth embodiment. The basic configuration of the bird's-eye view video display device 1 is the same as that of the bird's-eye view video display device 1 of the first embodiment. In the following descriptions, the same components as those of the bird's-eye view video display device 1 are denoted with the same or corresponding reference numbers and detailed descriptions of the components will be omitted. The bird's-eye view video display device 1 generates the first bird's-eye view video 100 (refer to FIG. 2), the superimposed bird's-eye view video 100A (refer to FIG. 17), or a superimposed bird's-eye view video 100B (refer to FIG. 23) of the vehicle.

When the relative positional relationship between the reference object B and the vehicle V does not meet a predetermined condition, the bird's-eye view video generator 44 generates the first bird's-eye view video 100 based on the vehicle icon 110. In other words, while the relative positional relationship between the reference object B and the vehicle V does not meet the predetermined condition, the bird's-eye view video generator 44 generates the first bird's-eye view video 100 in which the orientation and the position of the vehicle icon 110 are fixed. The first bird's-eye view video 100 based on the vehicle icon 110 is, in other words, the first bird's-eye view video based on the vehicle V.

When the relative positional relationship between the reference object B and the vehicle V meets the predetermined condition, the bird's-eye view video generator 44 generates, instead of the first bird's-eye view video 100 based on the vehicle icon 110, a bird's-eye view video ("second bird's-eye view video" below) based on information representing the relative orientation of the reference object B with respect to the vehicle V. In other words, while the relative positional relationship between the reference object B and the vehicle V meets the predetermined condition, the bird's-eye view video generator 44 generates a bird's-eye view video in which arrangement of information representing the relative orientation is fixed.

In the present embodiment, when a value of the relative orientation of the reference object B with respect to the vehicle V that are specified by the orientation specifying unit 46 is under a threshold, the bird's-eye view video generator 44 generates a second bird's-eye view video instead of the first bird's-eye view video 100. In the preset embodiment, the threshold is 5°.

In the second bird's-eye view video, information representing the relative orientation may correspond to the information representing the relative orientation in the first bird's-eye view video 100 in the case where it is determined that the value of the relative orientation of the reference object B with respect to the vehicle V is under the threshold. Alternatively, the information representing the relative orientation may be set to be parallel with the longitudinal direction or the lateral direction of the bird's-eye view video. In the present embodiment, the information representing the relative orientation is set to be parallel with the lateral direction of the bird's-eye view video and is fixed.

The value of the relative orientation of the reference object B with respect to the vehicle V is a value of the relative orientation of the reference object B with respect to a part of the vehicle V to be oriented to the reference object B. In the present embodiment, it is a value of the relative orientation of the reference object B with respect to a rear end Va of the vehicle V. More specifically, it is a difference in angle between the reference object B and the rear end Va of the vehicle V.

When the relative positional relationship between the reference object B and the vehicle V meets the predetermined condition, the cutting-out processor 442 performs a cutting-out processing of cutting the videos in cutting-out areas different from the cutting-out areas of the first bird's-eye view video 100 out of the surrounding video data on which the viewpoint conversion processing has been performed to generate the second bird's-eye view video.

The synthesizing processor 443 generates the first bird's-eye view video 100 or the second bird's-eye view video in which the vehicle icon 110 is displayed on the synthesized video.

The reference object detector 45 detects the reference object B that is present around the vehicle V. The reference object detector 45 detects the reference object B in the videos captured in the first imaging area A1, the second imaging area A2, the third imaging area A3, and the fourth imaging area A4. For this reason, the reference object B detected by the reference object detector 45 includes a reference object B that is present away from the display area A.

In the present embodiment, the orientation specifying unit 46 specifies a relative orientation of the reference object with respect to the rear end Va of the vehicle V as the relative orientation of the reference object with respect to the vehicle V.

The superimposing processor 48 superimposes the reference orientation icon 120 such that the relative orientation of the reference orientation icon 120 with respect to the rear end 110a of the vehicle icon 110 corresponds to the relative orientation specified by the orientation specifying unit 46 in the superimposed bird's-eye view video 100A.

When the relative positional relationship between the reference object B and the vehicle V meets the predetermined condition, the superimposing processor 48 generates the superimposed bird's-eye view video 100B by superimposing the reference orientation icon 120 on the second bird's-eye view video instead of the first bird's-eye view video 100.

Using FIG. 17, the superimposed bird's-eye view video 100A will be described. In FIG. 17, a rotational center 120a is represented by a cross. However, the cross need not be displayed on the superimposed bird's-eye view video 100A that is displayed on the display panel 31 practically. The same applies to other drawings.

When the relative positional relationship between the reference object B and the vehicle V changes while the superimposed bird's-eye view video 100A is being displayed, the reference orientation icon 120 rotates on the rotational center 120a in the superimposed bird's-eye view video 100A.

When the relative positional relationship between the reference object B and the vehicle V change while the superimposed bird's-eye view video 100B is being displayed, the orientation of the vehicle icon 110 changes with respect to the reference orientation icon 120.

Using FIG. 18, the superimposed bird's-eye view video 100A will be described. The superimposed bird's-eye view video 100A is different from the superimposed bird's-eye view video 100A illustrated in FIG. 17 in that the reference orientation icon 120 is superimposed such that the reference orientation icon 120 passes through the center of the vehicle icon 110.

The display controller 49 displays the first bird's-eye view video 100, the superimposed bird's-eye view video 100A, or the superimposed bird's-eye view video 100B on the display panel 31.

Using FIG. 19, a flow of processes in the bird's-eye view video generation device 40 will be described. For the processes of steps SS11 to SS15, step SS20, and step SS21, the same processes of steps S11 to S15, step S18, and step S19 are performed.

After YES determination is made at step SS13, the controller 41 may move to step SS15 without performing the process of step S14. When the reference object B is detected for the first time after displaying the bird's-eye view video at step S11 is started, the controller 41 may perform the process of step SS14 and, after the superimposed bird's-eye view video is displayed once at step SS19 and after YES determination is made at step SS13, may move to step SS15 without performing the process of step SS14.

The controller 41 determines whether the value of the relative orientation is under the threshold (step SS16). More specifically, the controller 41 determines whether the value of the relative orientation of the reference object B with respect to the vehicle V that are specified by the orientation specifying unit 46 is under the threshold. When it is determined that the value of the relative orientation is under the threshold (YES at step SS16), the controller 41 proceeds to step SS17. When it is determined that the value of the relative orientation is not under the threshold (NO at step SS16), the controller 41 proceeds to step SS18.

The controller 41 generates the superimposed bird's-eye view video 100B based on the reference object B (step SS17). More specifically, the controller 41 causes the bird's-eye view video generator 44 to generate a second bird's-eye view video based on the reference object B. The controller 41 causes the superimposing processor 48 to generate the superimposed bird's-eye view video 100B by superimposing the reference orientation icon 120 representing the orientation of the reference object B on the second bird's-eye view video. The controller 41 causes the superimposing processor 48 to generate the superimposed bird's-eye view video 100B by superimposing the reference orientation icon 120 with respect to the vehicle icon 110 on the side where the reference object B is present. The controller 41 proceeds to step SS19.

The controller 41 generates the superimposed bird's-eye view video 100A based on the vehicle icon 110 (step SS18). More specifically, the controller 41 causes the bird's-eye view video generator 44 to generate the first bird's-eye view video 100 based on the vehicle icon 110. The controller 41 causes the superimposing processor 48 to generate the superimposed bird's-eye view video 100A by superimposing the reference orientation icon 120 as the relative orientation based on the vehicle icon 110 on the first bird's-eye view video 100. The controller 41 causes the superimposing processor 48 to superimpose the reference orientation icon 120 with respect to the vehicle icon 110 on the side where the reference object B is present. The controller 41 proceeds to step SS19.

The controller 41 displays the superimposed bird's-eye view video 100A or the superimposed bird's-eye view video 100B (step SS19). More specifically, the controller 41 causes the display controller 49 to display the superimposed bird's-eye view video 100A or the superimposed bird's-eye view video 100B that is generated by the superimposing processor 48 on the display panel 31. The controller 41 proceeds to step SS21.

As described above, when the reference object B is detected around the vehicle V, the bird's-eye view video display device 1 outputs a video signal to display the first bird's-eye view video 100, the superimposed bird's-eye view video 100A, or the superimposed bird's-eye view video 100B on the display panel 31. The display panel 31 displays, for example, the superimposed bird's-eye view video 100A together a navigation screen based on the video signal that is output from the bird's-eye view video display device 1.

For example, using FIG. 20, FIG. 17 and FIGS. 21 to 25, the exemplary superimposed bird's-eye view video 100A or the exemplary superimposed bird's-eye view video 100B that is generated by the bird's-eye view video display device 1 in the case where the wheel stopper B1 and the rear frame line B2 are present when the vehicle moves backward will be described.

First of all, the vehicle is positioned near a parking position and the shift position is changed to the "reverse" position. The vehicle information acquiring unit 43 acquires the reverse trigger. As illustrated in FIG. 20, the vehicle V is away from the wheel stopper B1 and the rear frame line B2. In the parking slot illustrated in FIG. 20, there is no side frame line that marks the parking slot in the vehicle lateral direction. The wheel stopper B1 and the rear frame line B2 are present in the second imaging area A2 and are present away from the display area A of the first bird's-eye view video 100. In the present embodiment, the reference object detector 45 regards an object that is present in the direction in which the vehicle V travels and has great liner continuity as the reference object B. For this reason, in the present embodiment, the rear frame line B2 is regarded as the reference object B. The difference in angle between the rear frame line B2 as the reference object B and the rear end Va of the vehicle V is at or above the threshold.

At step SS11, the controller 41 determines that the reverse trigger is present and determines to start displaying a bird's-eye view video. At step SS12, the controller 41 causes the bird's-eye view video generator 44 to generate the first bird's-eye view video 100. At step SS13, the controller 41 determines that, for example, the rear frame line B2 is detected as the reference object B. At step SS14, the controller 41 determines that the rear frame line B2 is not present in the display area A in the first bird's-eye view video 100. At step SS15, the controller 41 specifies the relative orientation of the rear frame line B2 with respect to the vehicle. At step SS16, the controller 41 determines that the value of the relative orientation is not under the threshold (NO at step SS16). At step SS18, the controller 41 generates the superimposed bird's-eye view video 100A by superimposing the reference orientation icon 120 on the first bird's-eye view video 100 based on the vehicle icon 110. At step SS19, the controller 41 displays the generated superimposed bird's-eye view video 100A on the display panel 31.

For example, the controller 41 displays the superimposed bird's-eye view video 100A like that illustrated in FIG. 17 on the display panel 31. The superimposed bird's-eye view video 100A is based on the vehicle icon 110. The reference orientation icon 120 is superimposed on the rear video 102A. The difference in angle between the reference orientation icon 120 and the rear end 110*a* of the vehicle icon 110 is at or above the threshold.

A state, after the state illustrated in FIG. 20, where the vehicle V moves backward while being steered and thus the vehicle V and the rear frame line B2 get close to each other is illustrated in FIG. 21. The wheel stopper B1 and the rear frame line B2 are present in the second imaging area A2 and is present away from the display area A in the first bird's-eye view video 100. The difference in angle between the rear frame line B2 and the rear end Va of the vehicle V is at or above the threshold.

For example, the controller 41 displays the superimposed bird's-eye view video 100A like that illustrated in FIG. 22 on the display panel 31. The superimposed bird's-eye view video 100A is based on the vehicle icon 110. Compared to the state illustrated in FIG. 17, the reference orientation icon 120 turns clockwise on the rotational center 120*a*. The difference in angle between the reference orientation icon 120 and the rear end 110*a* of the vehicle icon 110 is at or above the threshold.

A state, after the state illustrated in FIG. 21, where the vehicle V is steered and the angle formed by the rear frame line B2 and the rear end Va of the vehicle V is under the threshold will be described.

At step SS13, the controller 41 determines that the rear frame line B2 is detected. At step SS14, the controller 41 determines that the rear frame line B2 is not present in the display area A in the first bird's-eye view video 100. At step SS15, the controller 41 specifies the relative orientation of the rear frame line B2. At step SS16, the controller 41 determines that the value of the relative orientation is under the threshold (YES at step SS16). At step SS17, the controller 41 generates the superimposed bird's-eye view video 100B obtained by superimposing the reference orientation icon 120 on the bird's-eye view video based on the rear frame line B2. At step SS19, the controller 41 displays the generated superimposed bird's-eye view video 100B on the display panel 31.

For example, the controller 41 displays the superimposed bird's-eye view video 100B which includes a front video 101B, a rear video 102B, a left-side video 103B, and a right-side video 104B like that illustrated in FIG. 23 on the display panel 31. The superimposed bird's-eye view video 100B is based on the reference orientation icon 120. The reference orientation icon 120 is arranged in parallel with the lateral direction. The difference in angle between the reference orientation icon 120 and the rear end 110*a* of the vehicle icon 110 is under the threshold. The vehicle icon 110 is arranged obliquely to the reference orientation icon 120. More specifically, compared to the state illustrated in FIG. 22, the vehicle icon 110 turns counterclockwise on its center as a rotational center.

When an operation of cutting the wheel is performed to adjust the parking position in the state where the superimposed bird's-eye view video 100B is displayed, the vehicle icon 110 turns on its center of the vehicle icon 110 as the rotational center along with a change in the relative orientation of the rear frame line B2 with respect to the vehicle V. The reference orientation icon 120 is fixed.

Furthermore, a state where the vehicle V moves backward while being steered and thus the vehicle V is positioned near the rear frame line B2 is illustrated in FIG. 24. The wheel stopper B1 and the rear frame line B2 are present in the second imaging area A2 and is present in the display area A in the first bird's-eye view video 100. The difference in angle between the rear frame line B2 and the rear end Va of the vehicle V is zero. The rear frame line B2 and the rear end Va of the vehicle V are parallel with each other.

At step SS13, the controller 41 determines that the rear frame line B2 is detected. At step SS14, the controller 41 determines that the rear frame line B2 is present in the display area A in the first bird's-eye view video 100. At step SS20, the controller 41 displays the first bird's-eye view video 100 on the display panel 31.

For example, the controller 41 displays the first bird's-eye view video 100 like that illustrated in FIG. 25 on the display panel 31. On the rear video 102, the wheel stopper B1 and the rear frame line B2 are displayed as the captured objects in the video. At step SS20, as illustrated in FIG. 25, the reference orientation icon 120 may be displayed in a superimposed manner together with the wheel stopper B1 and the rear frame line B2. Alternatively, at step SS20, the reference orientation icon 120 need not be displayed.

As described above, when the value of the relative orientation of the reference object B with respect to the vehicle V is under the threshold, the superimposed bird's-eye view video 100B based on the reference orientation icon 120 is displayed on the display panel 31 instead of the first bird's-eye view video 100 based on the vehicle icon 110. In the present embodiment, while the value of the relative orientation of the reference object B with respect to the vehicle V is under the threshold, the superimposed bird's-eye view video 100B in which the orientation of the reference orientation icon 120 is fixed is displayed. Thus, according to the present embodiment, when the value of the relative orientation of the reference object B with respect to the vehicle V is under the threshold, it is possible to make a display in which the orientation of the vehicle icon 110 with respect to the reference orientation icon 120 is easily determined promptly.

Particularly, according to the present embodiment, when the value of the relative orientation of the reference object B with respect to the vehicle V reduces while the vehicle is being parked and the parking position is adjusted finely, the orientation of the vehicle icon 110 with respect to the fixed reference orientation icon 120 changes. Accordingly, in the present embodiment, it is possible to make an operation such that the vehicle V is appropriately oriented while checking whether the vehicle V matches the orientation of the reference object B or how much the vehicle V is misaligned with the reference object B.

In a modification of the fourth embodiment, for example, in the processes of the flowchart illustrated in FIG. 19, the threshold of the value of the relative orientation for starting generation of the superimposed bird's-eye view video 100B, based on the reference object B when YES determination is made at step SS16 in the state where the superimposed bird's-eye view video 100A based on the vehicle icon 110, is set to be 5° as a first threshold. Furthermore, the threshold of the value of the relative orientation for starting generation of the superimposed bird's-eye view video 100A, based on the vehicle icon 110 when NO determination is made at step SS16 in the state where the superimposed bird's-eye view video 100B based on the reference object B, is set to be 15° as a second threshold larger than the first threshold. Accordingly, it is possible to continue displaying the superimposed bird's-eye view video 100B based on the reference object B only when the value of the relative orientation of the reference object B with respect to the vehicle V is small and the parking position is adjusted finely.

In another modification of the fourth embodiment, for example, in the processes of the flowchart illustrated in FIG. 19, after generation of the superimposed bird's-eye view video 100B based on the reference object B is started when YES determination is made at step SS16 in the state where the superimposed bird's-eye view video 100A based on the vehicle icon 110 is generated, generation of the superimposed bird's-eye view video 100B based on the reference object B may be continued until YES determination is made at step SS21 without determination at step SS16. Accordingly, it is possible to inhibit the orientation of the video to be displayed from frequently being switched.

As described above, in the present embodiment, it is possible to appropriately check the relative positional relationship between the vehicle and its surroundings.

Fifth Embodiment

Figure 26:
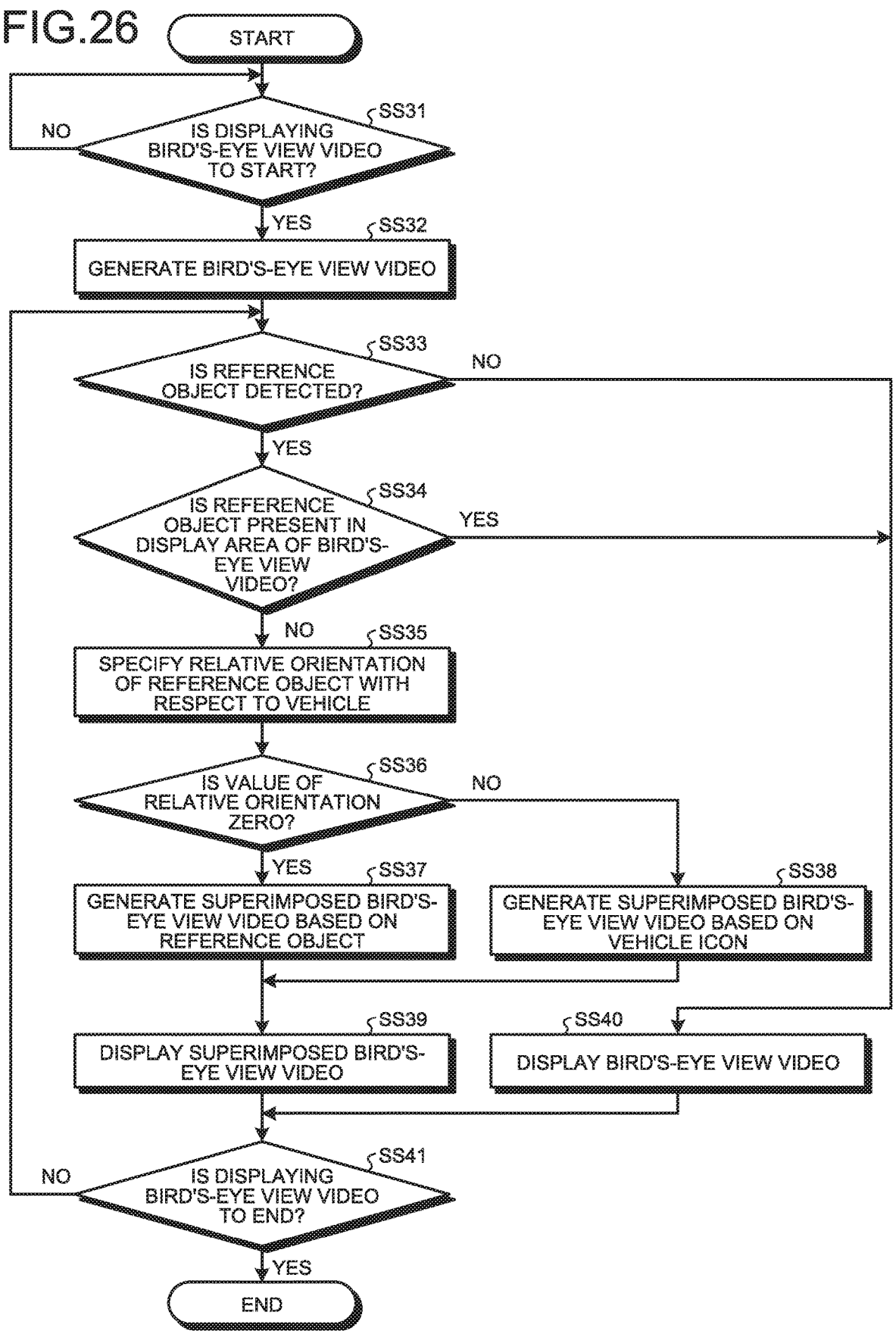
FIG. 26 is a flowchart illustrating a flow of processes in a bird's-eye view video generation device according to a fifth embodiment.
Figure 27:
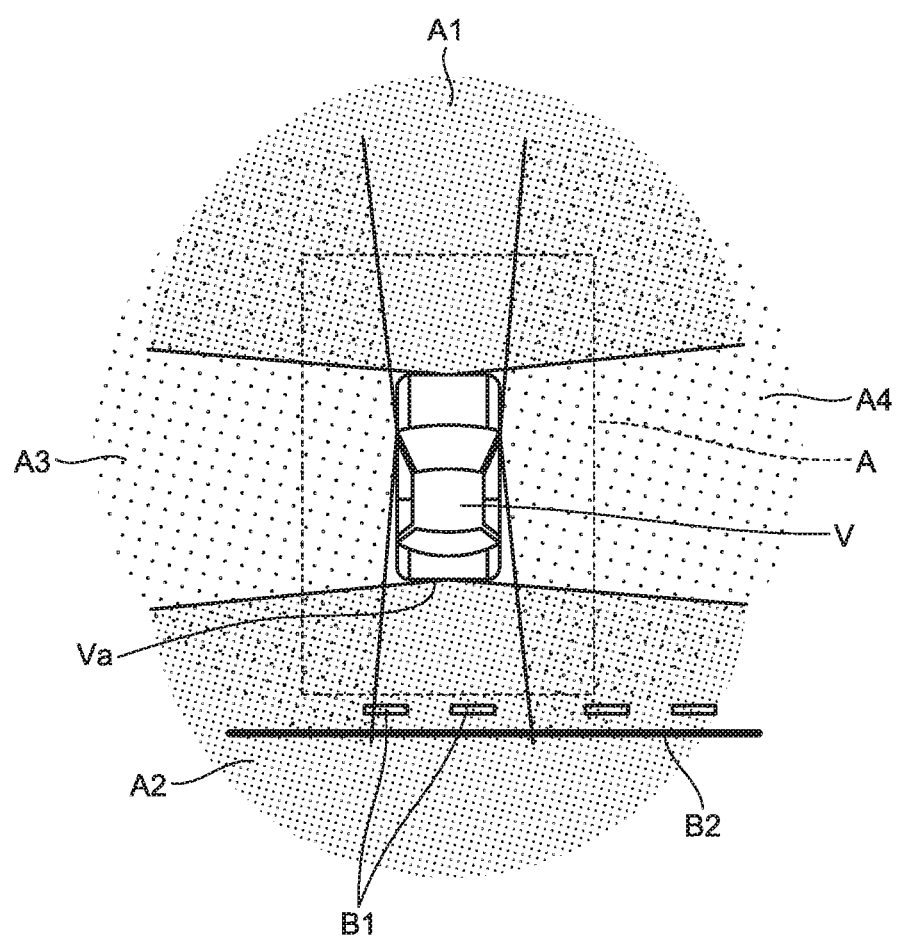
FIG. 27 is a diagram illustrating an exemplary positional relationship among a vehicle, a reference object, a display area, and an imaging area.
Figure 28:
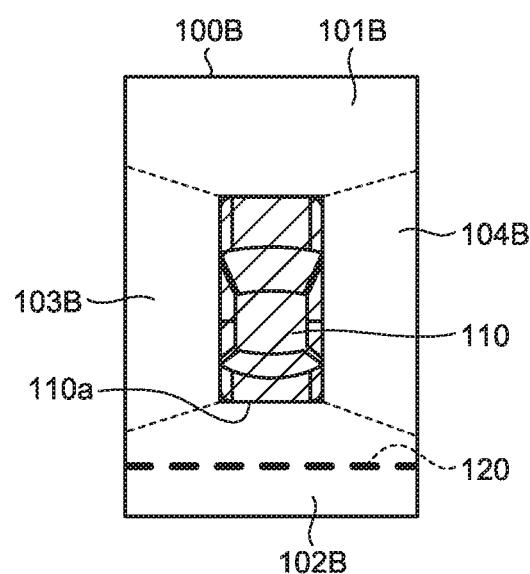
FIG. 28 is a diagram illustrating an exemplary superimposed bird's-eye view video that is generated by the bird's-eye view video generation device according to the fifth embodiment.
Figure 29:
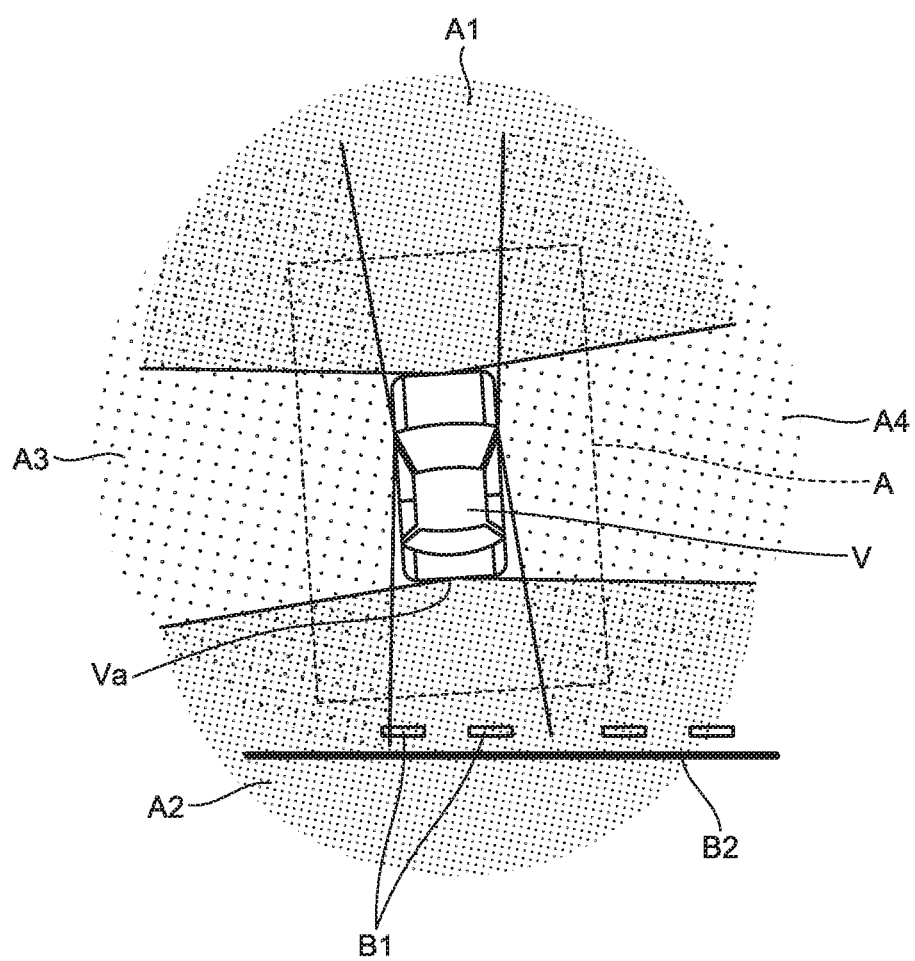
FIG. 29 is a diagram illustrating another exemplary positional relationship among the vehicle, the reference object, the display area, and the imaging area.
Figure 30:
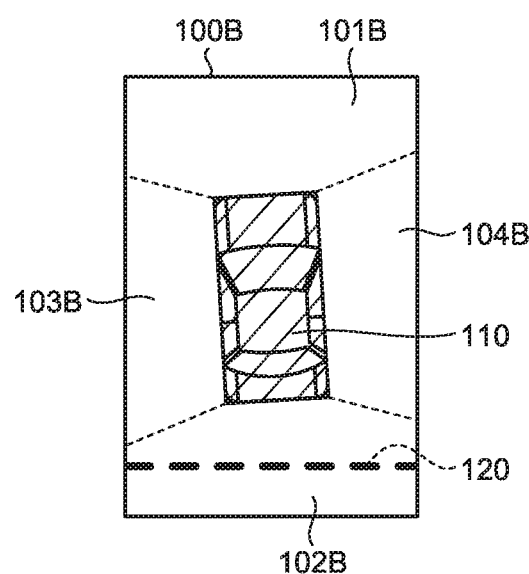
FIG. 30 is a diagram illustrating another exemplary superimposed bird's-eye view video that is generated by the bird's-eye view video generation device according to the fifth embodiment.

With reference to FIGS. 26 to 30, the bird's-eye view video display device 1 according to the present embodiment will be described. FIG. 26 is a flowchart illustrating a flow of processes in a bird's-eye view video generation device according to a fifth embodiment. FIG. 27 is a diagram illustrating an exemplary positional relationship among a vehicle, a reference object, a display area, and an imaging area. FIG. 28 is a diagram illustrating an exemplary superimposed bird's-eye view video that is generated by the bird's-eye view video generation device according to the fifth embodiment. FIG. 29 is a diagram illustrating another exemplary positional relationship among the vehicle, the reference object, the display area, and the imaging area. FIG. 30 is a diagram illustrating another exemplary superimposed bird's-eye view video that is generated by the bird's-eye view video generation device according to the fifth embodiment. The basic configuration of the bird's-eye view video display device 1 is the same as that of the bird's-eye view video display device 1 of the fourth embodiment. In the following descriptions, the same components as those of the bird's-eye view video display device 1 are denoted with the same or corresponding reference numbers and detailed descriptions of the components will be omitted.

When the relative orientation of the reference object B with respect to the vehicle V specified by the orientation specifying unit 46 match the orientation represented by the vehicle icon 110, the bird's-eye view video generator 44 generates the second bird's-eye view video instead of the first bird's-eye view video 100. In other words, when the orientation of the reference object B and the orientation of a part of the vehicle V to be oriented to the reference object B match, the bird's-eye view video generator 44 generates a bird's-eye view video in which the orientation of the reference orientation icon 120 is fixed. In the present embodiment, when the orientation of the reference object B and the orientation of the rear end Va of the vehicle V match, the bird's-eye view video generator 44 generates a bird's-eye view video in which the orientation and the position of the reference orientation icon 120 are fixed.

Using FIG. 26, a flow of processes in the bird's-eye view video generation device 40 will be described. For the processes of the flowchart illustrated in FIG. 26, the process of step SS36 is executed instead of the process of step SS16 in the flowchart illustrated in FIG. 19. For the processes of steps SS31 to SS35 and steps SS37 to SS41, the same processes of steps SS11 to SS15 and steps SS17 to SS21 are performed.

The controller 41 determines whether the relative orientation matches (step SS36). More specifically, the controller 41 determines whether the orientation of the reference object B and the orientation of the part of the vehicle V that are specified by the orientation specifying unit 46 match. When it is determined that the relative orientation matches (YES at step SS36), the controller 41 proceeds to step SS37. When it is determined that the relative orientation does not match (NO at step SS36), the controller 41 proceeds to step S38. The matching herein includes, in addition to complete matching, for example, matching in a range of, for example, approximately ±2°. It is determined that the relative orientation matches when the relative orientation matches temporarily while being varied.

When the difference in the relative orientation of the reference object B with respect to the vehicle V becomes zero, the orientation of the vehicle V matches the orientation of the reference object B. The orientation of the vehicle V matches the orientation of the reference object B when the orientation of the vehicle V is parallel with or orthogonal to the orientation of the reference object B. In other words, the orientation of the vehicle V matches the orientation of the reference object B when the vehicle is correctly orientated to the reference object B.

For example, using FIGS. 27 to 30, the exemplary superimposed bird's-eye view video 100B that is generated by the bird's-eye view video display device 1 in the case where the wheel stopper B1 and the rear frame line B2 are present behind when the vehicle moves backward will be described.

A state where the rear frame line B2 and the rear end Va of the vehicle V match as illustrated in FIG. 27 will be described. The difference in angle between the rear frame line B2 and the rear end Va of the vehicle V is zero. The rear frame line B2 and the rear end Va of the vehicle V are parallel with each other.

At step SS33, the controller 41 determines that the rear frame line B2 is detected. At step SS34, the controller 41 determines that the rear frame line B2 is not present in the display area A in the first bird's-eye view video 100. At step SS35, the controller 41 specifies the relative orientation of the rear frame line B2. At step SS36, the controller 41 determines that the relative orientation matches (YES at step SS36). At step SS37, the controller 41 generates the superimposed bird's-eye view video 100B by superimposing the reference orientation icon 120 on the bird's-eye view video based on the rear frame line B2. At step SS39, the controller 41 display the generated superimposed bird's-eye view video 100B on the display panel 31.

For example, the controller 41 displays the superimposed bird's-eye view video 100B like that illustrated in FIG. 28 on the display panel 31. The superimposed bird's-eye view video 100B is based on the reference orientation icon 120.

The reference orientation icon 120 is arranged in parallel with the lateral direction. The orientation of the reference orientation icon 120 and the orientation of the rear end 110*a* of the vehicle icon 110 match.

A state, after the state illustrated in FIG. 27, where the wheel is cut to adjust the parking position is illustrated in FIG. 29. The orientation of the rear frame line B2 and the orientation of the rear end Va of the vehicle V do not match.

For example, the controller 41 displays the superimposed bird's-eye view video 100B like that illustrated in FIG. 30 on the display panel 31. In the superimposed bird's-eye view video 100B, the orientation and position of the reference orientation icon 120 are fixed and are the same as the orientation and the position of the reference orientation icon 120 of the superimposed bird's-eye view video 100B illustrated in FIG. 28. The vehicle icon 110 is arranged obliquely to the reference orientation icon 120. More specifically, compared to the state illustrated in FIG. 28, the vehicle icon 110 turns counterclockwise on its center serving as the rotational center.

As described above, when the relative orientation of the reference object B with respect to the vehicle V match the orientation that is represented by the vehicle icon 110, the superimposed bird's-eye view video 100B based on the reference orientation icon 120 is displayed on the display panel 31 instead of the first bird's-eye view video 100 based on the vehicle icon 110. According to the present embodiment, when the value of the relative orientation of the reference object B with respect to the vehicle V is zero, the superimposed bird's-eye view video 100B in which the orientation of the reference orientation icon 120 is fixed is displayed. Accordingly, in the present embodiment, it is possible to make a display in which, while the wheel is being cut, a misalignment of the relative orientation of the reference object B with respect to the vehicle V after having been matched is easily checked. In this manner, in the present embodiment, it is possible to appropriately check the relative positional relationship between the vehicle and its surroundings.

In a modification of the fifth embodiment, for example, in the process of the flowchart illustrated in FIG. 26, as for determination at step SS36 after the generation of the superimposed bird's-eye view video 100B based on the reference object B has been started when YES determination is made at step SS36 in the state where the superimposed bird's-eye view video 100A based on the vehicle icon 110 had been generated, NO determination may be made at step SS36 according to determination whether the relative orientation is under the threshold approximately between 5° and 15° as at step SS16 in the fourth embodiment. Accordingly, after YES determination is made at step SS36, only when the value of the relative orientation of the reference object B with respect to the vehicle V is under the threshold, it is possible to continue displaying the superimposed bird's-eye view video 100B based on the reference object B.

In another modification of the fifth embodiment, for example, in the processes of the flowchart illustrated in FIG. 26, after the generation of the superimposed bird's-eye view video 100B based on the reference object B has been started when YES determination is made at step S36 in the state where the superimposed bird's-eye view video 100A based on the vehicle icon 110 had been generated, the generation of the superimposed bird's-eye view video 100B based on the reference object B may be continued until YES determination is made at step SS41 without determination at step SS36. Accordingly, it is possible to inhibit the orientation of the displayed video from being switched frequently.

Sixth Embodiment

Figure 31:
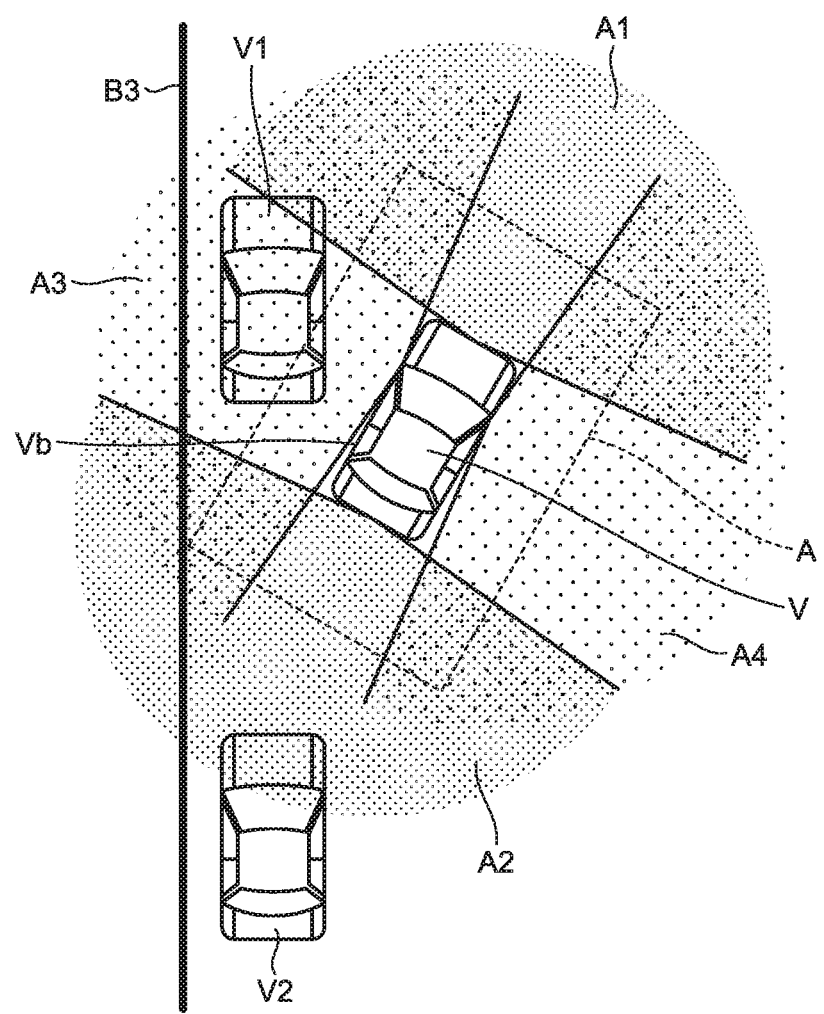
FIG. 31 is a diagram illustrating an exemplary positional relationship among a vehicle, a reference object, a display area, and an imaging area.
Figure 32:
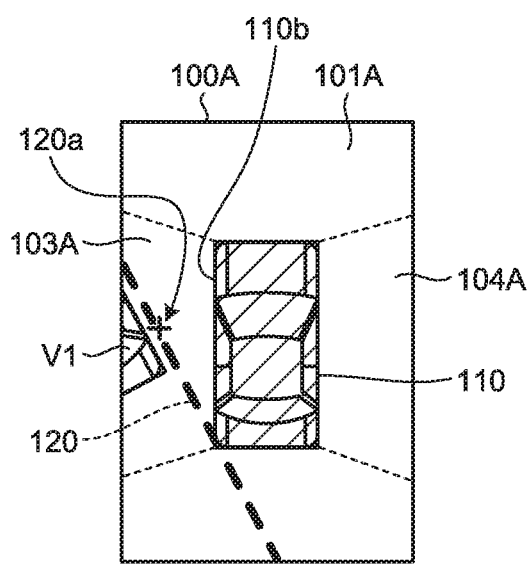
FIG. 32 is a diagram illustrating an exemplary superimposed bird's-eye view video that is generated by the bird's-eye view video generation device according to a sixth embodiment.
Figure 33:
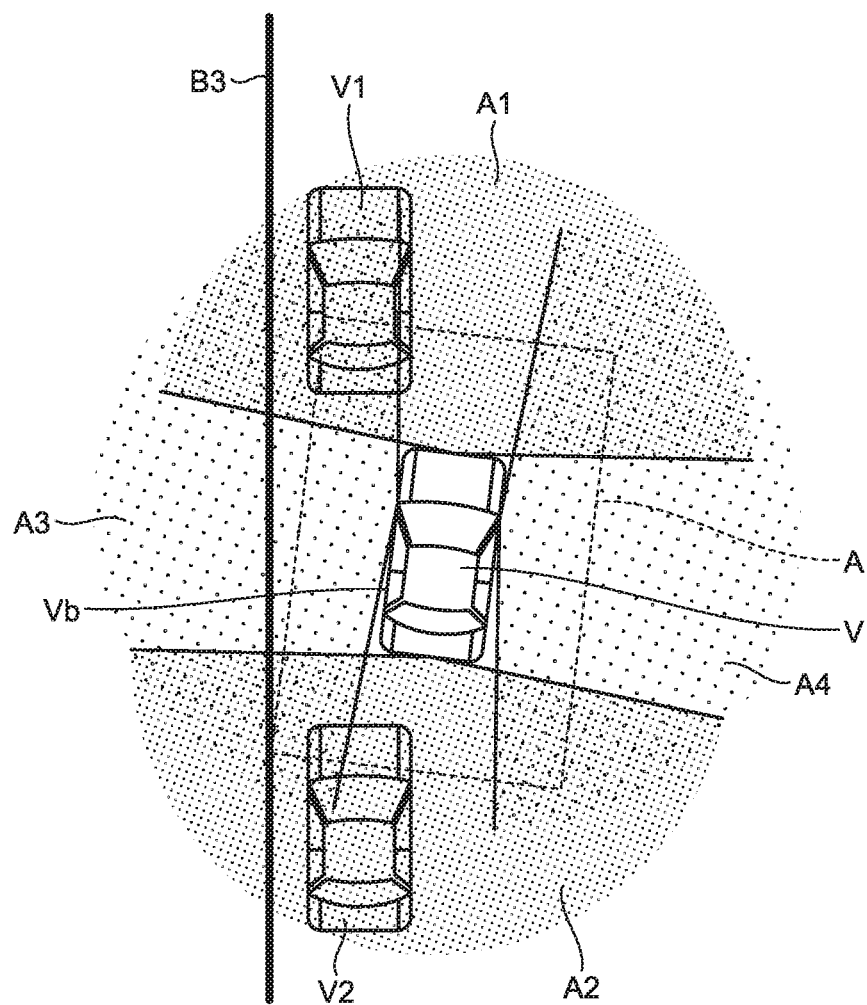
FIG. 33 is a diagram illustrating another exemplary positional relationship among the vehicle, the reference object, the display area, and the imaging area.
Figure 34:
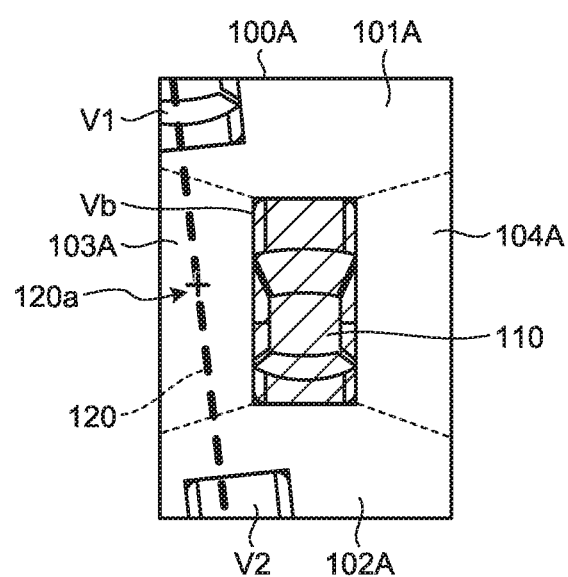
FIG. 34 is a diagram illustrating another exemplary superimposed bird's-eye view video that is generated by the bird's-eye view video generation device according to the sixth embodiment.
Figure 35:
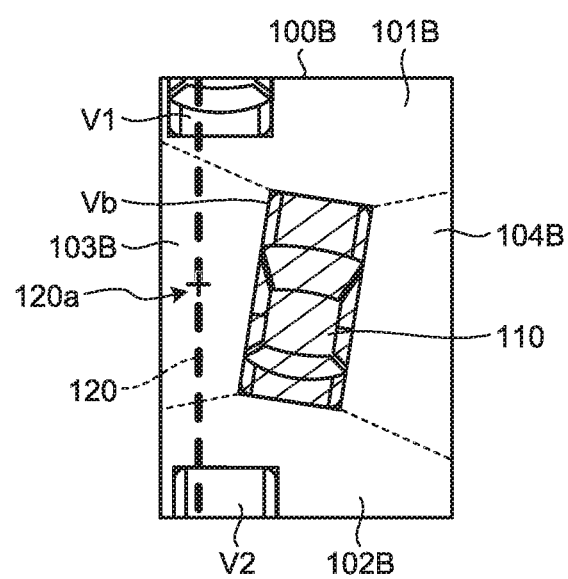
FIG. 35 is a diagram illustrating still another exemplary superimposed bird's-eye view video that is generated by the bird's-eye view video generation device according to the sixth embodiment.

With reference to FIGS. 31 to 35, the bird's-eye view video display device 1 according to the present embodiment will be described. FIG. 31 is a diagram illustrating an exemplary positional relationship among a vehicle, a reference object, a display area, and an imaging area. FIG. 32 is a diagram illustrating an exemplary superimposed bird's-eye view video that is generated by the bird's-eye view video generation device according to a sixth embodiment. FIG. 33 is a diagram illustrating another exemplary positional relationship among the vehicle, the reference object, the display area, and the imaging area. FIG. 34 is a diagram illustrating another exemplary superimposed bird's-eye view video that is generated by the bird's-eye view video generation device according to the sixth embodiment. FIG. 35 is a diagram illustrating another exemplary superimposed bird's-eye view video that is generated by the bird's-eye view video generation device according to the sixth embodiment.

In the present embodiment, the vehicle V is parked in parallel with the edge line B3 as the reference object B. There are the other vehicle V1 and the other vehicle V2 with a space in which the vehicle V is to be parked in between.

The reference object detector 45 performs the object recognition processing on the surroundings videos acquired by the video data acquiring unit 42 and detects the edge line B3 as the reference object B that is present around the vehicle V.

For example, when the reference object B is detected behind the vehicle V on the left, the superimposing processor 48 superimposes the reference orientation icon 120 on the rear video 102 and the left-side video 103 behind the vehicle icon 110 on the left. More specifically, for example, when the reference object B is detected behind the vehicle V on the left, the superimposing processor 48 may superimpose the reference orientation icon 120 such that the reference orientation icon 120 passes through the midpoint of the boundary between the rear video 102A and the left-side video 103A. For example, when the reference object B is detected behind the vehicle V on the left, the superimposing processor 48 may superimpose the reference orientation icon 120 such that the reference orientation icon 120 passes through a position that is away from the rear left end of the vehicle icon 110 by a predetermined distance.

Alternatively, the superimposing processor 48 may superimpose the reference orientation icon 120 such that the reference orientation icon 120 passes through the center of the vehicle icon 110.

For example, using FIGS. 31 to 35, the exemplary superimposed bird's-eye view video 100A or the exemplary superimposed bird's-eye view video 100B that is generated by the bird's-eye view video display device 1 in the case where the edge line B3 as the reference object B is present behind on the left when the vehicle is parked in parallel will be described.

First of all, the vehicle is positioned near a parking position and the shift position is changed to the "reverse" position. The vehicle information acquiring unit 43 acquires the reverse trigger. As illustrated in FIG. 31, the vehicle V is away from the edge line B3. The edge line B3 is present over the second imaging area A2 and the third imaging area A3, and is present away from the display area A in the first bird's-eye view video 100. The difference in angle between the edge line B3 and a left side Vb of the vehicle V is at or above a threshold.

For example, the controller 41 displays the superimposed bird's-eye view video 100A like that illustrated in FIG. 32 on the display panel 31. In the superimposed bird's-eye view video 100A, the vehicle icon 110 serves as a reference. The reference orientation icon 120 is superimposed on the rear video 102A and the left-side video 103A. The difference in angle between the reference orientation icon 120 and a left-side 110b of the vehicle icon 110 is at or above the threshold.

A state, after the state illustrated in FIG. 31, where the vehicle V moves backward while being steered and thus the vehicle V is positioned near the edge line B3 is illustrated in FIG. 33. The edge line B3 is present over the first imaging area A1, the second imaging area A2, and the third imaging area A3, and is present away from the display area A in the first bird's-eye view video 100. The other vehicle V1 is present in the display area A and is present in the first imaging area A1. The other vehicle V2 is present in the display area A and is present in the second imaging area A2.

For example, the controller 41 displays the superimposed bird's-eye view video 100A like that illustrated in FIG. 34 on the display panel 31. The superimposed bird's-eye view video 100A is based on the vehicle icon 110. In the superimposed bird's-eye view video 100A, the other vehicle V1 and the other vehicle V2 are displayed. Compared to the state illustrated in FIG. 32, the reference orientation icon 120 turns clockwise on the rotational center 120a.

Furthermore, a state where the vehicle V is steered and the value of the relative orientation of the reference object B with respect to the vehicle V is under the threshold will be described.

For example, the controller 41 displays the superimposed bird's-eye view video 100B like that illustrated in FIG. 35 on the display panel 31. The superimposed bird's-eye view video 100B is based on the reference orientation icon 120. The reference orientation icon 120 is arranged in parallel with the longitudinal direction. The difference in angle between the reference orientation icon 120 and the left-side 110b of the vehicle icon 110 is under the threshold. The vehicle icon 110 is displayed obliquely to the reference orientation icon 120. More specifically, compared to the state illustrated in FIG. 34, the vehicle icon 110 turns clockwise on its center serving as the rotational center.

As described above, also during parallel parking, when the value of the relative orientation of the reference object B with respect to the vehicle V is under the threshold, the superimposed bird's-eye view video 100B based on the reference orientation icon 120 is displayed on the display panel 31 instead of the first bird's-eye view video 100 based on the vehicle icon 110. As described above, in the present embodiment, it is possible to appropriately check the relative positional relationship between the vehicle and its surroundings even during parallel parking.

Seventh Embodiment

Figure 36:
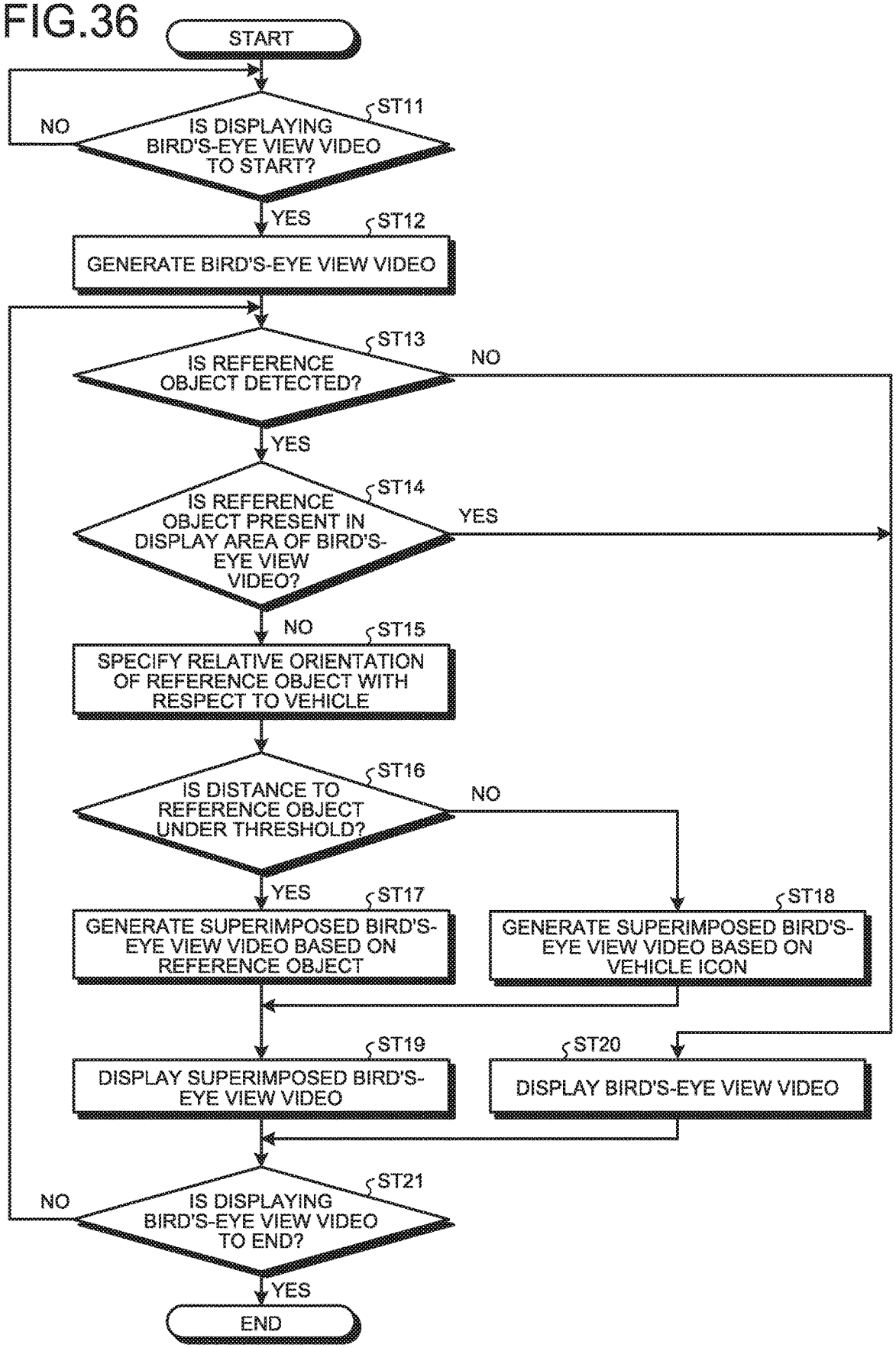
FIG. 36 is a flowchart illustrating a flow of processes in a bird's-eye view video generation device according to a seventh embodiment.
Figure 37:
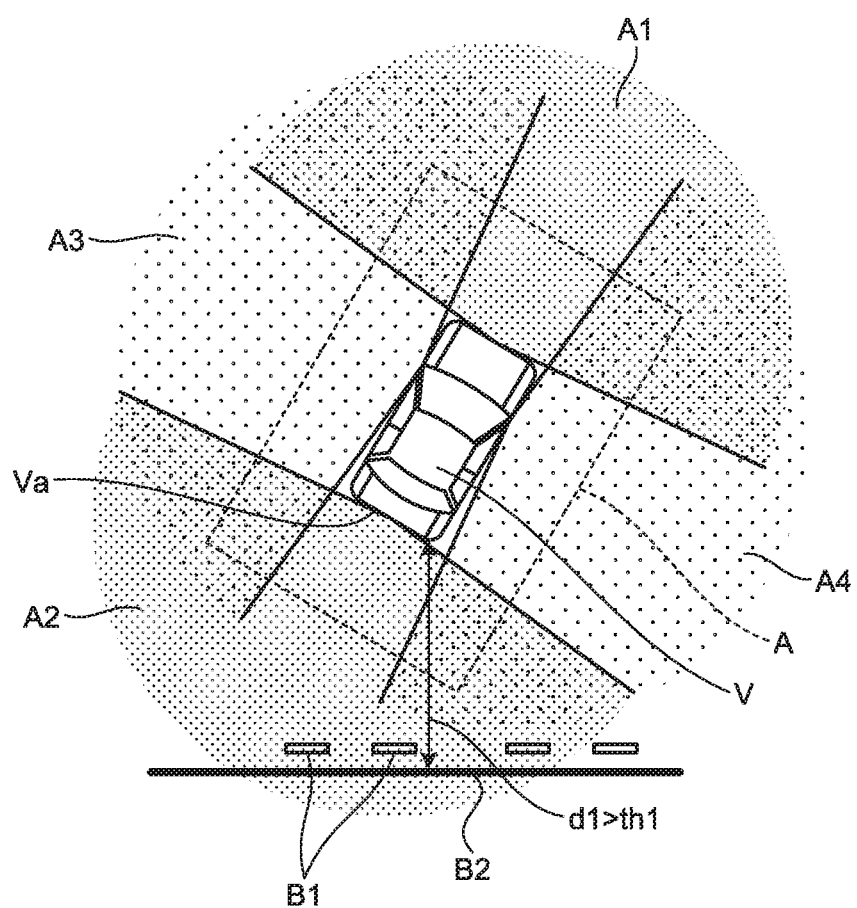
FIG. 37 is a diagram illustrating an exemplary positional relationship among a vehicle, a reference object, a display area, and an imaging area.
Figure 38:
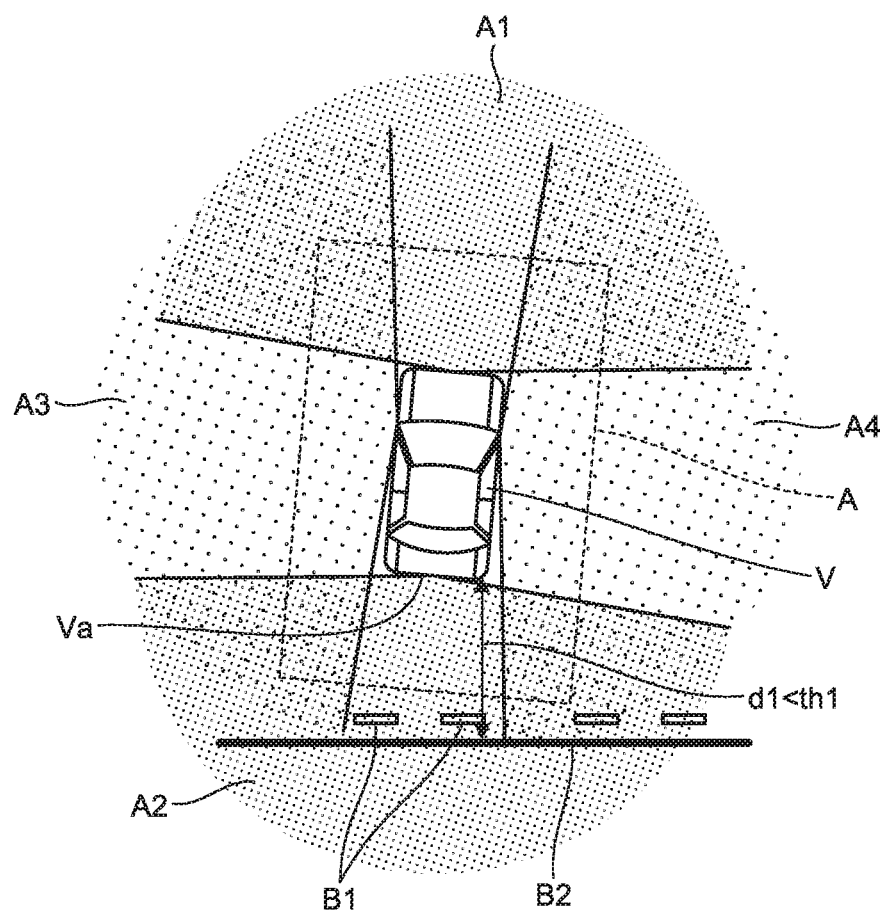
FIG. 38 is a diagram illustrating another exemplary positional relationship among the vehicle, the reference object, the display area, and the imaging area.

With reference to FIGS. 36 to 38, the bird's-eye view video display device 1 according to the present embodiment will be described. FIG. 36 is a flowchart illustrating a flow of processes in the bird's-eye view video generation device according to a seventh embodiment. FIG. 37 is a diagram illustrating an exemplary positional relationship among a vehicle, a reference object, a display area, and an imaging area. FIG. 38 is a diagram illustrating another exemplary positional relationship among the vehicle, the reference object, the display area, and the imaging area. The basic configuration of the bird's-eye view video display device 1 is the same as that of the bird's-eye view video display device 1 of the first embodiment. In the following descriptions, the same components as those of the bird's-eye view video display device 1 are denoted with the same or corresponding reference numbers and detailed descriptions of the components will be omitted. The controller 41 includes the video data acquiring unit 42, the vehicle information acquiring unit 43, the bird's-eye view video generator 44, the reference object detector 45, the orientation specifying unit 46, a distance detector 47 (not shown), the superimposing processor 48, and the display controller 49.

When a distance d1 between the reference object B and the vehicle V does not meet a predetermined condition, the bird's-eye view video generator 44 generates the first bird's-eye view video 100 based on the vehicle icon 110. In other words, while the distance d1 between the reference object B and the vehicle V does not meet the predetermined condition, the bird's-eye view video generator 44 generates the first bird's-eye view video 100 in which the orientation and the position of the vehicle icon 110 are fixed. The first bird's-eye view video 100 based on the vehicle icon 110 is, in other words, the first bird's-eye view video based on the vehicle V.

When the distance d1 between the reference object B and the vehicle V that is detected by the distance detector 47 meets the predetermined condition, the bird's-eye view video generator 44 generates, instead of the first bird's-eye view video 100, a bird's-eye view video ("second bird's-eye view video" below) based on information representing the relative orientation of the reference object B with respect to the vehicle V. In other words, the bird's-eye view video generator 44 generates a bird's-eye view video in which arrangement of the information representing the relative orientation is fixed while the distance d1 between the reference object B and the vehicle V meets the predetermined condition.

In the present embodiment, when the distance d1 between the reference object B and the vehicle V is under a threshold th1, the bird's-eye view video generator 44 generate the second bird's-eye view video instead of the first bird's-eye view video 100. The threshold th1 is preferably larger than the display area A. In the present embodiment, the threshold th1 is 2.5 m.

The information representing the relative orientation in the second bird's-eye view video may be fixed by arrangement of the information representing the relative orientation in the first bird's-eye view video 100 on which it is determined that the distance d1 between the reference object B and the vehicle V is under the threshold th1. Alternatively, in the second bird's-eye view video, the information representing the relative orientation may be arranged in parallel with the longitudinal direction or the lateral direction of the bird's-eye view video and may be fixed. In the present embodiment, the information representing the relative orientation is arranged in parallel with the lateral direction of the bird's-eye view video and is fixed.

When the distance d1 between the reference object B and the vehicle V meets the predetermined condition, the cutting-out processor 442 performs the cutting-out processing of cutting the videos in cutting-out areas different from the cutting-out areas of the first bird's-eye view video 100 out of the surrounding video data on which the viewpoint conversion processing has been performed to generate the second bird's-eye view video.

The distance detector 47 detects the distance d1 between the reference object B, which is detected by the reference object detector 45, and the vehicle V. More specifically, the distance detector 47 detects the distance d1 between the reference object B and the vehicle V from the position of the reference object B, which is detected by the reference object detector 45, in the video data. In the present embodiment, the distance d1 between the reference object B and the vehicle V is a distance between the reference object B and the vehicle V getting closest to each other. More specifically, the distance d1 is a distance between the reference object B and the rear end Va of the vehicle V getting closest to each other.

When the distance d1 between the reference object B and the vehicle V meets the predetermined condition, the superimposing processor 48 generate, the superimposed bird's-eye view video 100B by superimposing the reference orientation icon 120 on the second bird's-eye view video instead of the first bird's-eye view video 100.

Using FIG. 36, a flow of processes in the bird's-eye view video generation device 40 will be described. For the processes of steps ST11 to ST15 and steps ST17 to ST21, the same processes of steps SS11 to ST15 and steps SS17 to SS21 are performed.

The controller 41 determines whether the distance d1 to the reference object B is under the threshold th1 (step ST16). More specifically, the controller 41 determines whether the distance d1 between the reference object B and the vehicle V that is detected by the distance detector 47 is under the threshold th1. When it is determined that the distance d1 between the reference object B and the vehicle V is under the threshold th1 (YES at step ST16), the controller 41 proceeds to step ST17. When it is determined that the distance d1 between the reference object B and the vehicle V is not under the threshold th1 (NO at step ST16), the controller 41 proceeds to step ST18.

As described above, when the reference object B is detected around the vehicle V, the bird's-eye view video display device 1 outputs a video signal to display the first bird's-eye view video 100, the superimposed bird's-eye view video 100A, or the superimposed bird's-eye view video 100B on the display panel 31. The display panel 31 displays, for example, the superimposed bird's-eye view video 100A together with a navigation screen based on the video signal that is output from the bird's-eye view video display device 1.

For example, using FIG. 37, FIG. 17, FIG. 22, FIG. 38 and FIGS. 23 to 25, the exemplary superimposed bird's-eye view video 100A or the exemplary superimposed bird's-eye view video 100B that is generated by the bird's-eye view video display device 1 in the case where the wheel stopper B1 and the rear frame line B2 are present behind when the vehicle moves backward will be described.

First of all, the vehicle is positioned near a parking position and the shift position is changed to the "reverse" position. The vehicle information acquiring unit 43 acquires the reverse trigger. As illustrated in FIG. 37, the distance d1 between the rear frame line B2 as the reference object B and the vehicle V is at or above the threshold th1. In the parking slot illustrated in FIG. 37, there is no side frame line that marks the parking slot in the lateral direction of the vehicle. The wheel stopper B1 and the rear frame line B2 are present in the second imaging area A2 and are present away from the display area A of the first bird's-eye view video 100. In the present embodiment, the reference object detector 45 regards an object that is present in the direction in which the vehicle V travels and that has greater liner continuity as the reference object B. For this reason, in the present embodiment, the rear frame line B2 is regarded as the reference object B.

At step ST11, the controller 41 determines that the reverse trigger is present and determines to start displaying a bird's-eye view video. At step ST12, the controller 41 causes the bird's-eye view video generator 44 to generate the first bird's-eye view video 100. At step ST13, the controller 41 determines that, for example, the rear frame line B2 is detected as the reference object B. At step ST14, the controller 41 determines that the rear frame line B2 is not present in the display area A in the first bird's-eye view video 100. At step ST15, the controller 41 specifies the relative orientation of the rear frame line B2. At step ST16, the controller 41 determines that the distance d1 between the rear frame line B2 and the vehicle V is not under the threshold th1 (NO at step ST16). At step ST18, the controller 41 generates the superimposed bird's-eye view video 100A by superimposing the reference orientation icon 120 on the first bird's-eye view video 100. At step ST19, the controller 41 displays the generated superimposed bird's-eye view video 100A on the display panel 31.

For example, the controller 41 displays the superimposed bird's-eye view video 100A like that illustrated in FIG. 17 on the display panel 31. The superimposed bird's-eye view video 100A is based on the vehicle icon 110. The reference orientation icon 120 is superimposed on the rear video 102A.

A state, after the state illustrated in FIG. 37, where the vehicle V moves backward while being steered will be described. The distance d1 between the rear frame line B2 and the vehicle V is at or above the threshold th1.

For example, the controller 41 displays the superimposed bird's-eye view video 100A like that illustrated in FIG. 22 on the display panel 31. The superimposed bird's-eye view video 100A is based on the vehicle icon 110. Compared to the state illustrated in FIG. 17, the reference orientation icon 120 turns clockwise on the rotational center 120a.

Furthermore, a state where the vehicle V moves backward while being steered and thus the vehicle V and the rear frame line B2 get close to each other is illustrated in FIG. 38. The distance d1 between the rear frame line B2 and the vehicle V is under the threshold th1. The vehicle stopper B1 and the rear frame line B2 are present in the second imaging area A2 and are present away from the display area A in the first bird's-eye view video 100.

At step ST13, the controller 41 determines that the rear frame line B2 is detected. At step ST14, the controller 41 determines that the rear frame line B2 is not present in the display area A in the first bird's-eye view video 100. At step ST15, the controller 41 specifies the relative orientation of the rear frame line B2. At step ST16, the controller 41 determines that the distance d1 between the rear frame line B2 and the vehicle is under the threshold th1 (YES at step ST16). At step ST17, the controller 41 generates the superimposed bird's-eye view video 100B obtained by superimposing the reference orientation icon 120 on the bird's-eye view video based on the rear frame line B2. At step ST19, the controller 41 displays the generated superimposed bird's-eye view video 100B on the display panel 31.

For example, the controller 41 displays the superimposed bird's-eye view video 100B like that illustrated in FIG. 23 on the display panel 31. The superimposed bird's-eye view video 100B is based on the reference orientation icon 120. The reference orientation icon 120 is arranged in parallel with the lateral direction. The vehicle icon 110 is arranged obliquely to the reference orientation icon 120. More specifically, compared to the state illustrated in FIG. 22, the vehicle icon 110 turns counterclockwise on its center serving as the rotational center.

When an operation of cutting the wheel is performed to adjust the parking position in the state where the superimposed bird's-eye view video 100B is displayed, the vehicle icon 110 turns on the center of the vehicle icon 110 as the rotational center along with the change in the relative orientation of the rear frame line B2 with respect to the vehicle V. The reference orientation icon 120 is fixed.

A state where the vehicle V moves backward while being steered and thus the vehicle V is positioned near the rear frame line B2 is illustrated in FIG. 24. The distance d1 between the rear frame line B2 and the vehicle V is under the threshold th1. The wheel stopper B1 and the rear frame line B2 are present in the second imaging area A2 and are present in the display area A in the first bird's-eye view video 100. The difference in angle between the rear frame line B2 and the rear end Va of the vehicle V is zero. The rear frame line B2 and the rear end Va of the vehicle V are parallel with each other.

At step ST13, the controller 41 determines that the rear frame line B2 is detected. At step ST14, the controller 41 determines that the rear frame line B2 is present in the display area A in the first bird's-eye view video 100. At step ST20, the controller 41 displays the first bird's-eye view video 100 on the display panel 31.

For example, the controller 41 displays the first bird's-eye view video 100 like that illustrated in FIG. 25 on the display panel 31. On the rear video 102, the wheel stopper B1 and the rear frame line B2 are displayed as captured objects in the video. At step ST20, as illustrated in FIG. 25, the reference orientation icon 120 may be displayed in a superimposed manner together with the wheel stopper B1 and the rear frame line B2. Alternatively, at step ST20, the reference orientation icon 120 need not be displayed.

As described above, when the distance d1 between the reference object B and the vehicle V is under the threshold th1, the superimposed bird's-eye view video 100B based on the reference orientation icon 120 is displayed on the display panel 31 instead of the first bird's-eye view video 100 based on the vehicle icon 110. In the present embodiment, while the distance d1 between the reference object B and the vehicle V is under the threshold th1, the superimposed bird's-eye view video 100B in which the orientation of the reference orientation icon 120 is fixed is displayed. Thus, according to the present embodiment, when the distance d1 between the reference object B and the vehicle V is under the threshold th1, it is possible to make a display in which the orientation of the vehicle icon 110 with respect to the reference orientation icon 120 is easily determined promptly.

Particularly, according to the present embodiment, when the distance d1 between the reference object B and the vehicle V reduces while the vehicle is being parked and the parking position is adjusted finely, the orientation of the vehicle icon 110 with respect to the fixed reference orientation icon 120 changes. Accordingly, in the present embodiment, it is possible to make an operation such that the vehicle V is appropriately oriented while checking whether the vehicle V matches the orientation of the reference object B or how much the vehicle V is misaligned.

In a modification of the seventh embodiment, for example, in the processes of the flowchart illustrated in FIG. 36, the threshold th1 at step ST16 in the state where the superimposed bird's-eye view video 100A based on the vehicle icon 110 has been generated is, for example, 2.5 m. Furthermore, the threshold th1 at step ST16 in the state where the superimposed bird's-eye view video 100B based on the reference object B has been generated is, for example, 3.5 m. Accordingly, only when the distance d1 between the reference object B and the vehicle V is small and the parking position is adjusted finely, it is possible to continue displaying the superimposed bird's-eye view video 100B based on the reference object B.

In another modification of the seventh embodiment, for example, in the processes of the flowchart illustrated in FIG. 36, after the generation of the superimposed bird's-eye view video 100B based on the reference object B has been started when YES determination may be made at step ST16 in the state where the superimposed bird's-eye view video 100A based on the vehicle icon 110 had been generated, the generation of the superimposed bird's-eye view video 100B based on the reference object B may be continued until YES determination is made at step ST21 without making determination at step ST16. Accordingly, it is possible to inhibit the orientation of the video to be displayed from being frequently switched.

As described above, in the present embodiment, it is possible to appropriately check the relative positional relationship between the vehicle and its surroundings.

Eighth Embodiment

Figure 39:
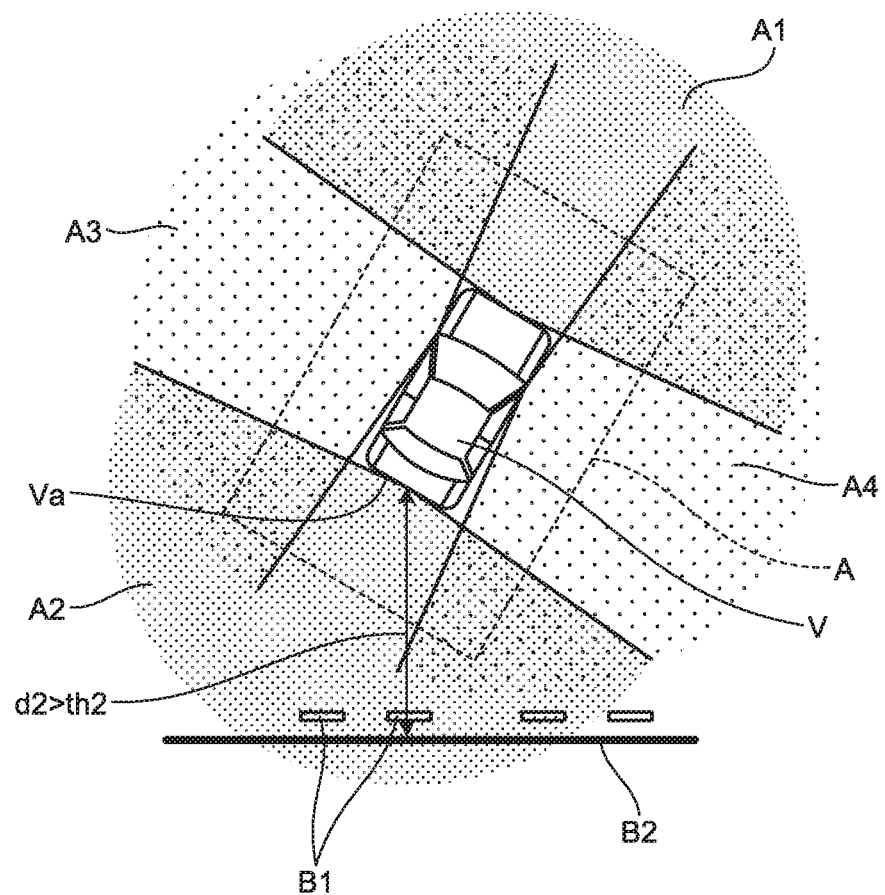
FIG. 39 is a diagram illustrating still another exemplary positional relationship among the vehicle, the reference object, the display area, and the imaging area.

With reference to FIG. 39, the bird's-eye view video display device 1 according to the present embodiment will be described. FIG. 39 is a diagram illustrating another exemplary positional relationship among the vehicle, the reference object, the display area, and the imaging area. The basic configuration of the bird's-eye view video display device 1 is the same as that of the bird's-eye view video display device 1 of the seventh embodiment. In the following descriptions, the same components as those of the bird's-eye view video display device 1 are denoted with the same or corresponding reference numbers and detailed descriptions of the components will be omitted.

The distance between the reference object B and the vehicle V is a distance d2 between the reference object B, which is detected by the reference object detector 45, and a reference position in an opposed part in the vehicle V which is opposed to the reference object B. In the present embodiment, the reference position is a center of the opposed part. The opposed part that is opposed to the reference object B in the vehicle V is a part in the vehicle V that faces the reference object B. In the present embodiment, the opposed part is the rear end Va of the vehicle V.

The threshold th2 is a value equal to or larger than the threshold th1 of the seventh embodiment.

As described above, when the distance d2 between the reference object B and the reference position in the opposed part in the vehicle V is under the threshold th2, the superimposed bird's-eye view video 100B based on the reference orientation icon 120 is displayed on the display panel 31 instead of the first bird's-eye view video 100 based on the vehicle icon 110. As described above, in the present embodiment, it is possible to appropriately check the relative positional relationship between the vehicle and its surroundings.

Ninth Embodiment

Figure 40:
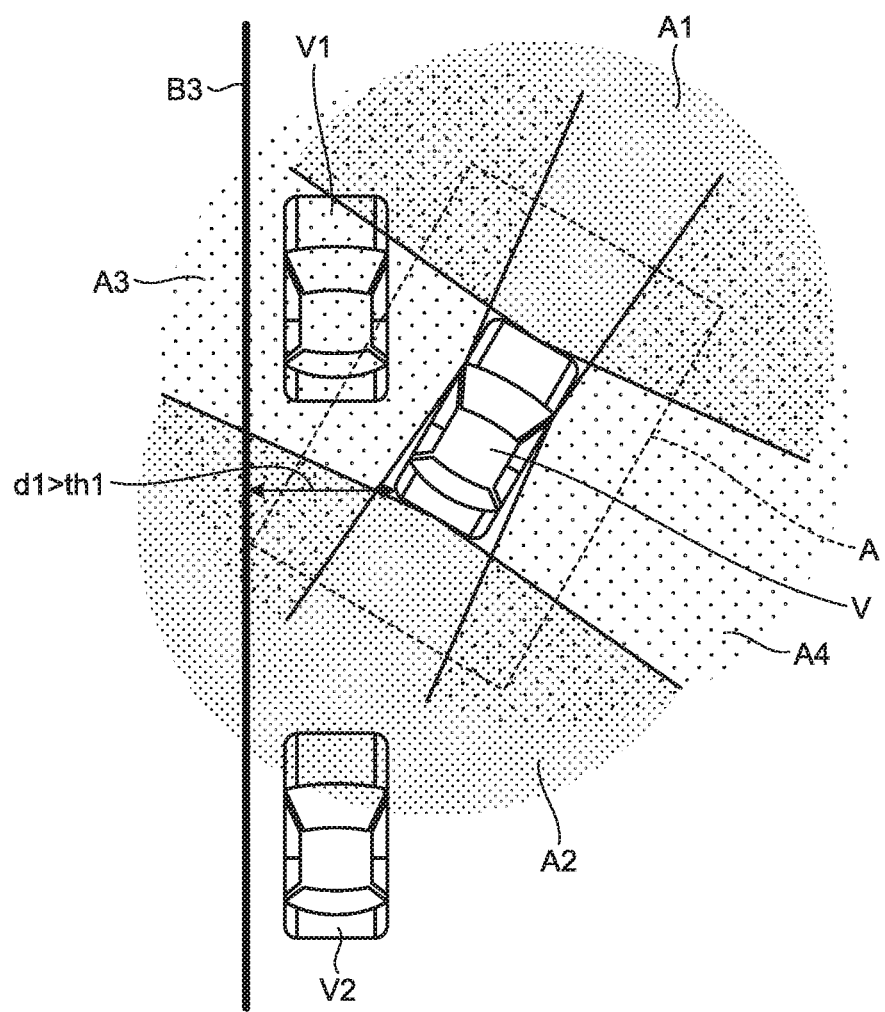
FIG. 40 is a diagram illustrating an exemplary positional relationship among a vehicle, a reference object, a display area, and an imaging area.
Figure 41:
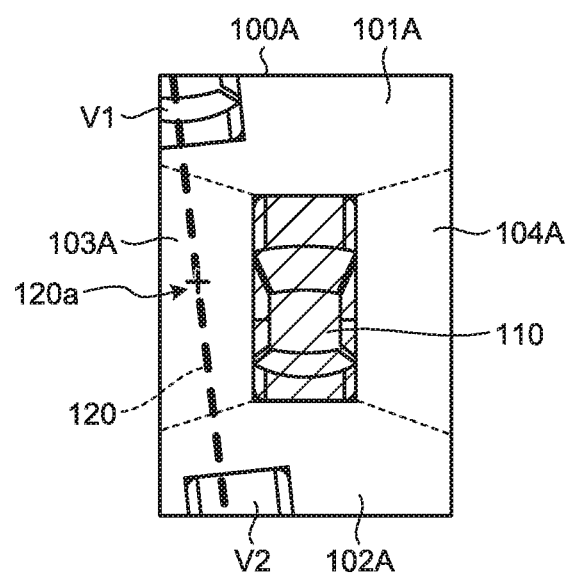
FIG. 41 is a diagram illustrating an exemplary superimposed bird's-eye view video that is generated by a bird's-eye view video generation device according to a ninth embodiment.
Figure 42:
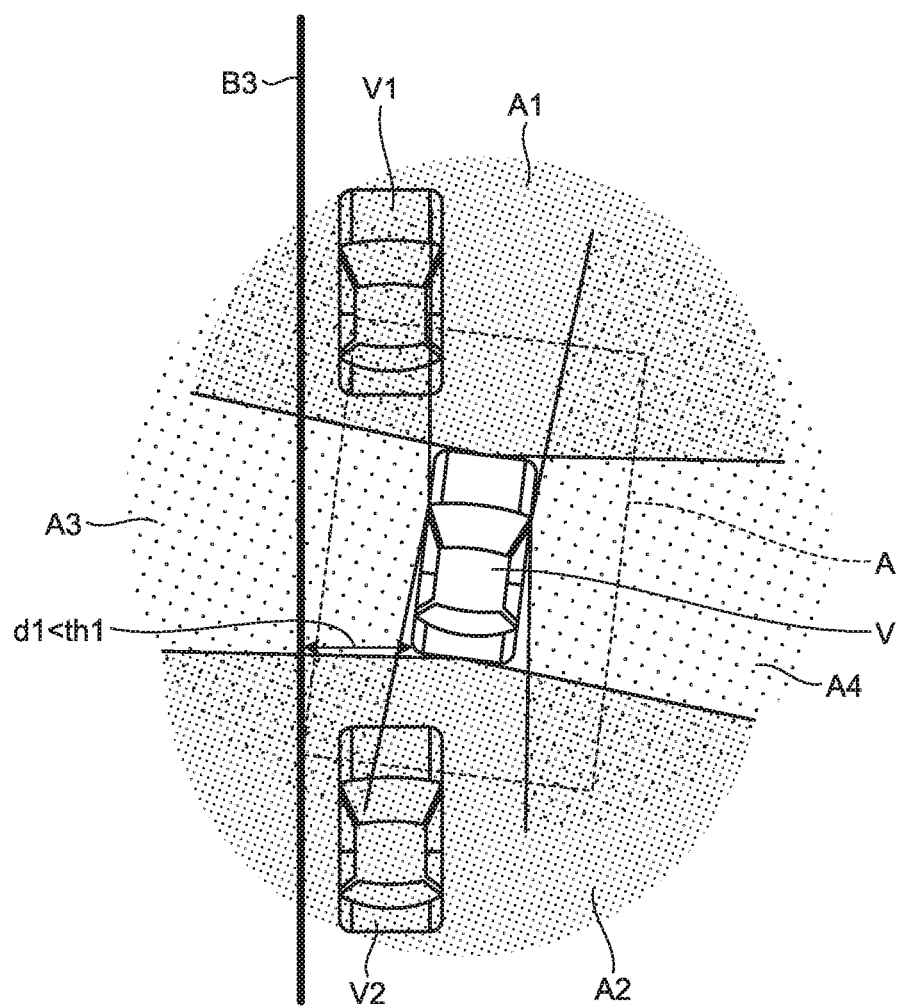
FIG. 42 is a diagram illustrating an exemplary positional relationship among a vehicle, a reference object, a display area, and an imaging area.
Figure 43:
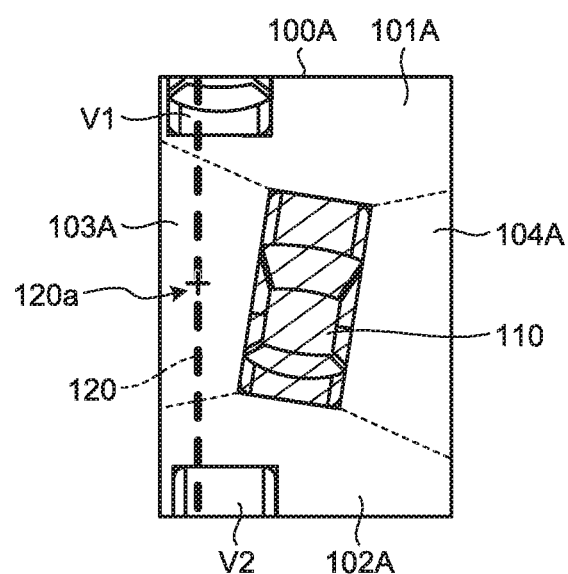
FIG. 43 is a diagram illustrating another exemplary superimposed bird's-eye view video that is generated by the bird's-eye view video generation device according to the ninth embodiment.

With reference to FIGS. 40 to 43, the bird's-eye view video display device 1 according to the present embodiment will be described. FIG. 40 is a diagram illustrating an exemplary positional relationship among a vehicle, a reference object, a display area, and an imaging area. FIG. 41 is a diagram illustrating an exemplary superimposed bird's- eye view video that is generated by a bird's-eye view video generation device according to a ninth embodiment. FIG. 42 is a diagram illustrating an exemplary positional relationship among the vehicle, the reference object, the display area, and the imaging area. FIG. 43 is a diagram illustrating another exemplary superimposed bird's-eye view video that is generated by the bird's-eye view video generation device according to the ninth embodiment.

In the present embodiment, the vehicle V is parked in parallel with the edge line B3 as the reference object B. There are the other vehicle V1 and the other vehicle V2 with a space in which the vehicle V is to be parked in between.

The reference object detector 45 performs the object recognition processing on the surroundings videos acquired by the video data acquiring unit 42 and detects the edge line B3 as the reference object B that is present around the vehicle V.

For example, when the reference object B is detected behind the vehicle V on the left, the superimposing processor 48 superimposes the reference orientation icon 120 on the rear video 102 and the left-side video 103 behind the vehicle icon 110 on the left. More specifically, for example, when the reference object B is detected behind the vehicle V on the left, the superimposing processor 48 may superimpose the reference orientation icon 120 such that the reference orientation icon 120 passes through the midpoint of the boundary between the rear video 102A and the left-side video 103A. For example, when the reference object B is detected behind the vehicle V on the left, the superimposing processor 48 may superimpose the reference orientation icon 120 such that the reference orientation icon 120 passes through a position that is away from the rear left end of the vehicle icon 110 by a predetermined distance.

Alternatively, the superimposing processor 48 may superimpose the reference orientation icon 120 such that the reference orientation icon 120 passes through the center of the vehicle icon 110.

For example, the exemplary superimposed bird's-eye view video 100A or the exemplary superimposed bird's-eye view video 100B that is generated by the bird's-eye view video display device 1 in the case where the edge line B3 as the reference object B is present behind on the left on parallel parking will be described using FIGS. 40 to 43.

First of all, the vehicle is positioned near a parking position and the shift position is changed to the "reverse" position. The vehicle information acquiring unit 43 acquires the reverse trigger. As illustrated in FIG. 40, the distance d1 between the edge line B3 and the vehicle V is at or above the threshold th1. The edge line B3 is present over the second imaging area A2 and the third imaging area A3, and is present away from the display area A in the first bird's-eye view video 100.

For example, the controller 41 displays the superimposed bird's-eye view video 100A like that illustrated in FIG. 32 on the display panel 31. The superimposed bird's-eye view video 100A is based on the vehicle icon 110. The reference orientation icon 120 is superimposed on the rear video 102A and the left-side video 103A.

A state, after the state illustrated in FIG. 40, where the vehicle V moves backward while being steered will be described. The distance d1 between the rear frame line B2 and the vehicle V is at or above the threshold th1.

For example, the controller 41 displays the superimposed bird's-eye view video 100A like that illustrated in FIG. 41 on the display panel 31. The superimposed bird's-eye view video 100A is based on the vehicle icon 110. In the superimposed bird's-eye view video 100A, the other vehicle V1 and the other vehicle V2 are displayed. Compared to the state illustrated in FIG. 32, the reference orientation icon 120 turns clockwise on the rotational center 120a.

Furthermore, a state where the vehicle V is steered and the distance between the edge line B3 and the vehicle V is under the threshold th1 is illustrated in FIG. 42.

For example, the controller 41 displays the superimposed bird's-eye view video 100B like that illustrated in FIG. 43 on the display panel 31. The superimposed bird's-eye view video 100B is based on the reference orientation icon 120. The reference orientation icon 120 is arranged in parallel with the longitudinal direction. The vehicle icon 110 is displayed obliquely to the reference orientation icon 120. More specifically, compared to the state illustrated in FIG. 41, the vehicle icon 110 turns clockwise on its center as the rotational center.

As described above, also during parallel parking, when the distance d1 between the reference object B and the vehicle V is under the threshold th1, the superimposed bird's-eye view video 100B based on the reference orientation icon 120 is displayed on the display panel 31 instead of the first bird's-eye view video 100 based on the vehicle icon 110. As described above, in the present embodiment, it is possible to appropriately check the relative positional relationship between the vehicle and its surroundings even during parallel parking.

The bird's-eye view video display device 1 according to the present application has been described. However, the present application may be carried out in various different modes in addition to the above-described embodiments.

The components of the bird's-eye view video display device 1 illustrated in the drawings are functional ideas and need not necessarily be configured physically as illustrated in the drawings. In other words, the specific mode of each device is not limited to that illustrated in the drawings, and all or part of the devices may be distributed or integrated functionally or physically per any unit and according to processing load on each device or situation in which the device is used.

The configuration of the bird's-eye view video display device 1 is implemented, for example, as software by a program that is loaded as a software into a memory, or the like. In the above-described embodiment, the configuration has been described as functional blocks implemented by association among the sets of hardware or software. In other words, the functional blocks may be implemented with only hardware or only software or in various forms using combinations of hardware and software.

The above-described components include those easily assumable by those skilled in the art and those substantially the same as the above-described components. Furthermore, the above-described components may be combined as appropriate. Furthermore, it is possible to make various types of omission, replacement or change among the components within the scope of the present application.

The superimposing processor 48 may change the display mode of the reference orientation icon 120 to be superimposed according to the distance between the reference object B and the vehicle V. For example, at least one of a thickness, color, and a line type of the reference orientation icon 120 may be changed according to the distance between the reference object B and the vehicle V. The shorter the distance between the reference object B and the vehicle V is, the more the line in which the reference orientation icon 120 is displayed may be bold. The shorter the distance between the reference object B and the vehicle V is, the darker the line in which the reference orientation icon 120 is displayed may be. The reference orientation icon 120 may be displayed in a dotted line when the distance between the reference object B and the vehicle V is large and may be displayed in a solid line when the distance between the reference object B and the vehicle V is short.

The superimposing processor 48 may change the display mode of the reference orientation icon 120 to be superimposed according to the relative orientation of the reference object B with respect to the vehicle V. For example, at least one of a thickness, color, and a line type of the reference orientation icon 120 may be changed according to the orientation of the vehicle V with respect to a direction of extension of the reference object B. The reference orientation icon 120 may be represented in a light line when misalignment of the orientation of the vehicle V with respect to the direction of extension of the reference object B is larger than a predetermined value and, as the misalignment of the orientation of the vehicle V with respect to the direction of extension of the reference object B reduces, the reference orientation icon 120 may be displayed in a more bold line. The reference orientation icon 120 may be represented in a red line when the misalignment of the orientation of the vehicle V with respect to the direction of extension of the reference object B is larger than the predetermined value and the reference orientation icon 120 may be displayed such that the reference orientation icon 120 changes to green as the misalignment of the orientation of the vehicle V with respect to the direction of extension of the reference object B reduces. The reference orientation icon 120 may be displayed in a dotted line when the misalignment of the orientation of the vehicle V with respect to the direction of extension of the reference object B is larger than the predetermined value and the reference orientation icon 120 may be displayed such that the reference orientation icon 120 is changed to a solid line as the misalignment of the orientation of the vehicle V with respect to the direction of extension of the reference object B reduces.

When the misalignment of the orientation of the vehicle V with respect to the direction of extension of the reference object B reaches zero, the orientation of the vehicle V matches the direction of extension of the reference object B. The orientation of the vehicle V matches the direction of extension of the reference object B when the orientation of the vehicle V is parallel with or orthogonal to the direction of extension of the reference object B. In other words, the orientation of the vehicle V matches the direction of extension of the reference object B when the vehicle is correctly oriented to the reference object B.

The vehicle icon 110 may be displayed with the end of the vehicle V in the direction in which the vehicle V travels, in other words, the part of the vehicle V to be oriented to the reference orientation icon 120, being colored. Accordingly, the superimposed bird's-eye view video 100A enables easier checking of the orientation of the subject B and the orientation of the vehicle V. The part to be oriented to the reference orientation icon 120 may be specified according to the relative positional relationship between the direction in which the vehicle V travels and the reference object B or may be specified by relative positional relationship with the surrounding objects in the captured video by performing image processing on the captured video data. Alternatively, as for the part oriented to the reference orientation icon 120, a part that is chosen by the user on the vehicle icon 110 displayed on the display panel 31 may be specified as the part.

The reference orientation icon 120 has been described as one formed by a dotted line but is not limited thereto. The reference orientation icon 120 may be, for example, a belt-like shape.

According to the present application, it is possible to appropriately check a relative positional relationship between a vehicle and its surroundings.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bird's-eye view video generation device comprising:
   a video data acquiring unit configured to acquire video data of surroundings video of a vehicle captured by a video-capturing unit;
   a bird's-eye view video generator configured to generate a first bird's-eye view video that displays a predetermined display area around the vehicle by performing a viewpoint conversion processing and a synthesizing processing on the video data of the surroundings videos acquired by the video data acquiring unit with a vehicle icon representing the vehicle;
   a reference object detector configured to detect, in the first bird's-eye view video, at least one reference object around the vehicle which is an object with a length equal or more than a predetermined length in the first bird's-eye view video;
   an orientation specifying unit configured to specify a relative orientation of the at least one reference object detected by the reference object detector with respect to the vehicle;
   a superimposing processor configured to generate a superimposed bird's-eye view video by superimposing a reference orientation icon which is a line that extends along a direction in which the at least one reference object extend and which represents the relative orientation of the at least one reference object with respect to the vehicle on the first bird's-eye view video; and
   a display controller configured to cause a display to display the first bird's-eye view video or the superimposed bird's-eye view video generated by the superimposing processor,
   wherein,
   the display controller is further configured, when the at least one reference object is specified to be present in a display area of the first bird's-eye view video by the orientation specifying unit, to display the first bird's-eye view video on the display, and
   when the at least one reference object is specified not to be present in the display area of the first bird's-eye view video by the orientation specifying unit, to display,
   in a case in which a value of the relative orientation of the at least one reference object with respect to the vehicle is over a threshold, a superimposed bird's-eye view video which is generated by the superimposing processor by superimposing the reference orientation icon on the first bird's-eye view video and in which the vehicle icon is arranged with its longitudinal direction being parallel with a longitudinal direction of the first bird's-eye view video, and
   in a case in which the value of the relative orientation of the at least one reference object with respect to the vehicle is under the threshold, a second superimposed bird's-eye view video which is generated by the superimposing processor by superimposing the reference orientation icon on the first bird's-eye view video and in which the reference orientation icon is arranged in parallel with a lateral direction or a longitudinal direction of the first bird's-eye view video.

2. The bird's-eye view video generation device according to claim 1, wherein, when the relative orientation of the at least one reference object with respect to the vehicle that are specified by the orientation specifying unit matches an orientation represented by the vehicle icon, the bird's-eye view video generator is further configured to generate the second superimposed bird's-eye view video.

3. The bird's-eye view video generation device according to claim 1, wherein, while the value of the relative orientation of the at least one reference object with respect to the vehicle that are specified by the orientation specifying unit is under the threshold, the bird's-eye view video generator is further configured to generate the second superimposed bird's-eye view video.

4. The bird's-eye view video generation device according to claim 1, wherein the superimposing processor is further configured to change a display mode of the reference orientation icon according to the relative orientation of the at least one reference object with respect to the vehicle.

5. The bird's-eye view video generation device according to claim 1, further comprising a distance detector configured to detect a distance between the at least one reference object that is detected by the reference object detector and the vehicle,
wherein, when the distance between the at least one reference object and the vehicle as the positional relationship between the at least one reference object and the vehicle meets a predetermined condition, the bird's-eye view video generator is further configured to generate the second superimposed bird's-eye view video.

6. The bird's-eye view video generation device according to claim 5, wherein, when the distance between the at least one reference object and the vehicle which is detected by the distance detector is under the threshold, the bird's-eye view video generator is further configured to generate the second superimposed bird's-eye view video.

7. The bird's-eye view video generation device according to claim 6, wherein
the distance detector is further configured to detect a closest distance between the at least one reference object detected by the reference object detector and the vehicle, and
when the closest distance between the at least one reference object and the vehicle detected by the distance detector is under the threshold, the bird's-eye view video generator is further configured to generate the second superimposed bird's-eye view video.

8. The bird's-eye view video generation device according to claim 6, wherein
the distance detector is further configured to detect a distance between the at least one reference object detected by the reference object detector and a reference position in an opposed part which is opposed to the at least one reference object in the vehicle, and
when the distance between the at least one reference object and the reference position in the opposed part which is opposed to the at least one reference object in the vehicle is under a predetermined threshold value, the bird's-eye view video generator is further configured to generate the second superimposed bird's-eye view video.

9. The bird's-eye view video generation device according to claim 6, wherein, while the distance between the at least one reference object and the vehicle that is detected by the distance detector is under the threshold, the bird's-eye view video generator is further configured to generate the second superimposed bird's-eye view video.

10. A bird's-eye view video display device comprising:
the bird's-eye view video generation device according to claim 1; and
at least one of the video-capturing unit configured to supply the video data of the surroundings videos to the video data acquiring unit and the display that is caused by the display controller to display the superimposed bird's-eye view video.

11. A bird's-eye view video generation method comprising:
acquiring video data of surroundings video of a vehicle captured by a video-capturing unit;
generating a first bird's-eye view video that displays a predetermined display area around the vehicle by performing a viewpoint conversion processing and synthesizing processing on the acquired video data of the surroundings with a vehicle icon representing the vehicle;
detecting, in the first bird's-eye view video, at least one reference object around the vehicle which is an object with a length equal or more than a predetermined length in the first bird's-eye view video;
specifying a relative orientation of the detected at least one reference object with respect to the vehicle;
generating a superimposed bird's-eye view video by superimposing a reference orientation icon which is a line that extends along a direction in which the at least one reference object extends and which represents the relative orientation of the at least one reference object with respect to the vehicle on the generated first bird's-eye view video icon; and
causing a display to display the generated first bird's-eye view video or the generated superimposed bird's-eye view video,
wherein, when the at least one reference object is specified to be present in a display area of the first bird's-eye view video, causing the display to display the first bird's-eye view video, and
when the at least one reference object is specified not to be present in the display area of the first bird's-eye view video, causing the display to display,
in a case in which a value of the relative orientation of the at least one reference object with respect to the vehicle is equal to or larger than a threshold, a superimposed bird's-eye view video which is generated by superimposing the reference orientation icon on the first bird's-eye view video and in which the vehicle icon is arranged with its longitudinal direction being parallel with a longitudinal direction of the first bird's-eye view video, and
in a case in which the value of the relative orientation of the at least one reference object with respect to the vehicle is smaller than the threshold, a second superimposed bird's-eye view video which is generated by superimposing the reference orientation icon on the first bird's-eye view video and in which the reference orientation icon is arranged in parallel with a lateral direction or a longitudinal direction of the first bird's-eye view video.

12. A non-transitory storage medium that stores a program for causing a computer that operates as a bird's-eye view video generation device to execute a process comprising:

acquiring video data of surroundings video of a vehicle captured by a video-capturing unit;

generating a first bird's-eye view video that displays a predetermined display area around the vehicle by performing a viewpoint conversion processing and synthesizing processing on the acquired video data of the surroundings with a vehicle icon representing the vehicle;

detecting, in the first bird's-eye view video at least one reference object around the vehicle which is an object with a length equal or more than a predetermined length in the first bird's-eye view video;

specifying a relative orientation of the detected at least one reference object with respect to the vehicle;

generating a superimposed bird's-eye view video by superimposing a reference orientation icon which is a line that extends along a direction in which the at least one reference object extends and which represents the relative orientation of the at least one reference object with respect to the vehicle on the generated first bird's-eye view video; and causing a display to display the generated first bird's-eye view video or the generated superimposed bird's-eye view video, wherein, when the at least one reference object is specified to be present in a display area of the first bird's-eye view video, causing the display to display the first bird's-eye view video, and when the at least one reference object is specified not to be present in the display area of the first bird's-eye view video, causing the display to display, in a case in which a value of the relative orientation of the at least one reference object with respect to the vehicle is equal to or larger than a threshold, a superimposed bird's-eye view video which is generated by superimposing the reference orientation icon on the first bird's-eye view video and in which the vehicle icon is arranged with its longitudinal direction being parallel with a longitudinal direction of the first bird's-eye view video, and in a case in which the value of the relative orientation of the at least one reference object with respect to the vehicle is smaller than the threshold, a second superimposed bird's-eye view video which is generated by superimposing the reference orientation icon on the first bird's-eye view video and in which the reference orientation icon is arranged in parallel with a lateral direction or a longitudinal direction of the first bird's-eye view video.

\* \* \* \* \*